(12) United States Patent
Ogino

(10) Patent No.: US 10,976,548 B2
(45) Date of Patent: Apr. 13, 2021

(54) DISPLAY SYSTEM, MOBILE OBJECT, AND OPTICAL ELEMENT

(71) Applicant: Shimpei Ogino, Kanagawa (JP)

(72) Inventor: Shimpei Ogino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/815,002

(22) Filed: Mar. 11, 2020

(65) Prior Publication Data
US 2020/0301138 A1    Sep. 24, 2020

(30) Foreign Application Priority Data

Mar. 18, 2019  (JP) ............... JP2019-050326
Sep. 25, 2019  (JP) ............... JP2019-173705

(51) Int. Cl.
*G02B 27/01*    (2006.01)
*B60K 35/00*    (2006.01)
*G02B 3/00*     (2006.01)

(52) U.S. Cl.
CPC .......... *G02B 27/0101* (2013.01); *B60K 35/00* (2013.01); *G02B 3/0056* (2013.01);
(Continued)

(58) Field of Classification Search
CPC .......... G02B 27/0101; G02B 2027/011; G02B 2027/013; G02B 2027/0196; B60K 35/00; B60K 2370/1529
See application file for complete search history.

(56) References Cited

U.S. PATENT DOCUMENTS

| | | |
|---|---|---|
| 2013/0063754 A1 | 3/2013 | Saisho et al. |
| 2014/0177022 A1 | 6/2014 | Saisho et al. |

(Continued)

FOREIGN PATENT DOCUMENTS

| | | |
|---|---|---|
| EP | 3104212 A2 | 12/2016 |
| EP | 3173844 A1 | 5/2017 |
| JP | 2017-078827 | 4/2017 |

OTHER PUBLICATIONS

Extended European Search Report dated Aug. 19, 2020, issued in corresponding European Patent Application No. 20161616.6, 10 pages.

(Continued)

*Primary Examiner* — Priyank J Shah
(74) *Attorney, Agent, or Firm* — Xsensus LLP

(57) ABSTRACT

A display system, a mobile object, and an optical element. The display system includes an optical device through which light diverges, a light deflector configured to scan a light emitted from a light source in a main scanning direction and a sub-scanning direction orthogonal to the main scanning direction to form an intermediate image on the optical device, and an imaging optical system configured to project diverging light diverging through the optical device to form an image. An effective diameter a of a mirror of the light deflector for the intermediate image and a ratio c of a size of an image formed by the imaging optical system to the effective diameter a satisfy a condition in an equation given below.

$$2 \geq 0.007 a^{-2} c^2 + 0.75 a^{-0.75} c + 0.5 a^{-0.5}$$

The mobile object includes the display system, and the reflector is a front windshield. The optical element is used for the display system.

11 Claims, 21 Drawing Sheets

(52) U.S. Cl.
CPC .......... *B60K 2370/1529* (2019.05); *G02B 2027/011* (2013.01); *G02B 2027/013* (2013.01); *G02B 2027/0196* (2013.01)

(56) References Cited

U.S. PATENT DOCUMENTS

| | | |
|---|---|---|
| 2015/0219803 A1 | 8/2015 | Inamoto et al. |
| 2015/0277115 A1 | 10/2015 | Inamoto et al. |
| 2016/0320615 A1 | 11/2016 | Nakamura et al. |
| 2016/0334637 A1 | 11/2016 | Saisho et al. |
| 2017/0154406 A1* | 6/2017 | Atsuumi .............. B60K 35/00 |
| 2019/0285877 A1 | 9/2019 | Ogino et al. |
| 2019/0285906 A1 | 9/2019 | Ogino |
| 2020/0132983 A1* | 4/2020 | Ogino .............. G02B 3/0056 |

OTHER PUBLICATIONS

Chapter 13: In: Eugene Hecht: "Optics", Jan. 1, 2020, pp. 594-596, New York, XP002799923.

* cited by examiner

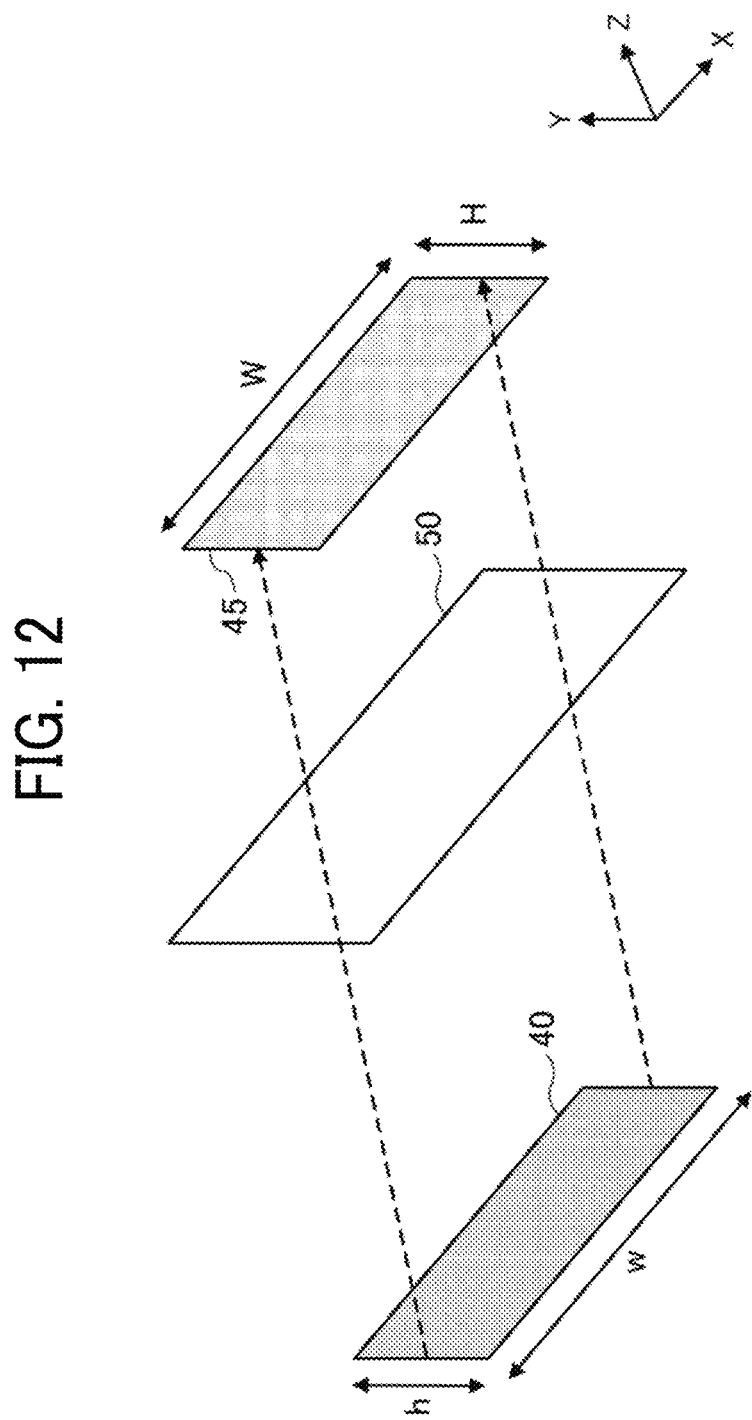

DISPLAY SYSTEM, MOBILE OBJECT, AND OPTICAL ELEMENT

CROSS-REFERENCE TO RELATED APPLICATIONS

This patent application is based on and claims priority pursuant to 35 U.S.C. § 119(a) to Japanese Patent Application Nos. 2019-050326 and 2019-173705, filed on Mar. 18, 2019, and Sep. 25, 2019, respectively, in the Japan Patent Office, the entire disclosures of which are hereby incorporated by reference herein.

BACKGROUND

Technical Field

Embodiments of the present disclosure relate to a display system, a mobile object, and an optical element.

Background Art

Display devices such as a heads-up display (HUD) are used as an application in a mobile object such as a vehicle that allows a driver (viewer) to recognize various kinds of information (for example, vehicle information, navigation information, and warning information) with a reduced amount of movement in line of vision.

For example, a HUD is known in the art in which the beam diameter D is equal to or greater than the pitch P of at least two elements that make up a micromirror array or a microlens array (MLA) but is less than twice as much as the pitch P.

SUMMARY

Embodiments of the present disclosure described herein provide a display system, a mobile object, and an optical element. The display system includes an optical device through which light diverges, a light deflector configured to scan a light emitted from a light source in a main scanning direction and a sub-scanning direction orthogonal to the main scanning direction to form an intermediate image on the optical device, and an imaging optical system configured to project diverging light diverging through the optical device to form an image. An effective diameter a of a mirror of the light deflector for the intermediate image and a ratio c of a size of an image formed by the imaging optical system to the effective diameter a satisfy a condition in an equation given below.

$$2 \geq 0.007 a^{-2} c^2 + 0.75 a^{-0.75} c + 0.5 a^{-0.5}$$

The mobile object includes the display system, and the reflector is a front windshield. The optical element is used for the display system.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 12 is a diagram illustrating the relation between an intermediate image and a virtual image, according to embodiments of the present disclosure.

Figure 1:
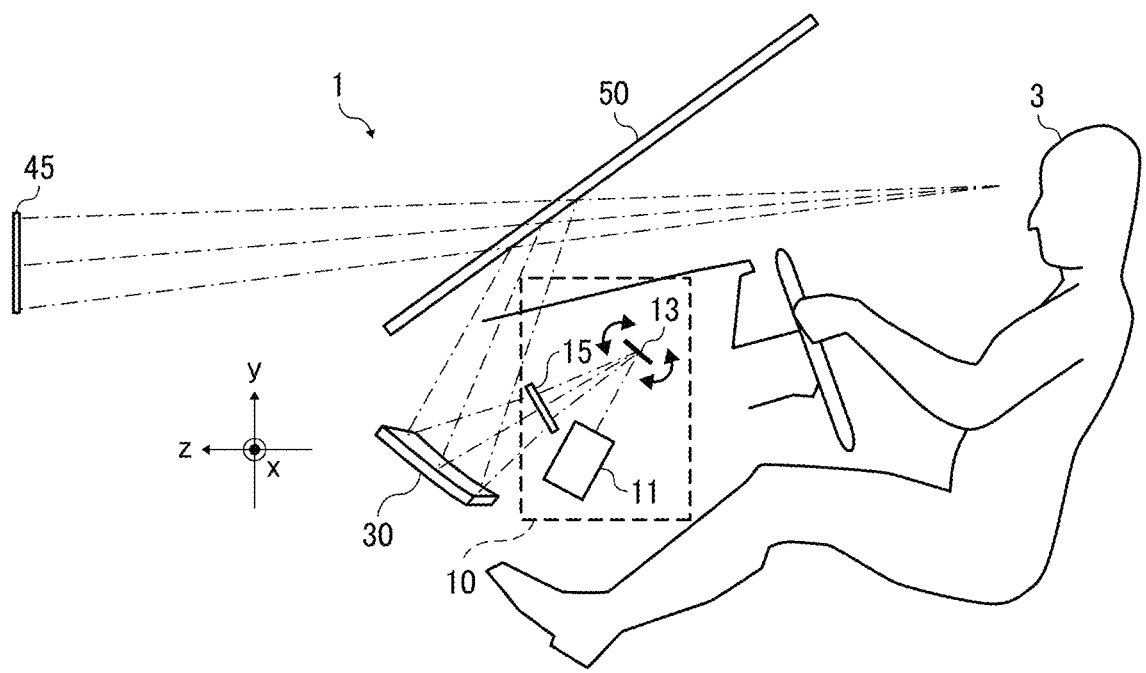
FIG. 1 is a diagram illustrating a system configuration of a display system according to embodiments of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the accompanying drawings. In the description of the drawings, like reference signs denote like elements, and overlapping descriptions are omitted.

FIG. 1 is a diagram illustrating a system configuration of a display system 1 according to embodiments of the present disclosure.

The display system 1 as illustrated in FIG. 1 can prevent the brightness of a display image from decreasing without reducing the resolution of the display image that is visually recognized by a viewer 3.

In the display system 1, the viewer 3 can visually identify a display image as the projection light that is projected from a display device 10 is projected onto a transmissive reflector. The display image is image superimposed on the viewing field of the viewer 3 as a virtual image 45. For example, the display system 1 is provided for a mobile object such as a vehicle, an aircraft, and a ship, or an immobile object such as a maneuvering simulation system, and a home-theater system. In the present embodiment, cases are described in which the display system 1 is provided for a car that is an example of a mobile object. However, no limitation is intended thereby, and the type of usage of the display system 1 is not limited to the present embodiment.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In such cases, the front windshield 50 serves as a transmissive reflector that transmits a portion of the incident light and reflects at least some of the remaining incident light. The distance between the location of the eyepoint of the viewer 3 and the front windshield 50 is about several tens of centimeters (cm) to one meter (m).

The display system 1 includes a display device 10, a free-form surface mirror 30, and a front windshield 50. For example, the display device 10, is a heads-up display (HUD) provided for a vehicle as an example of the mobile object. The display device 10 may be arranged at any desired position in conformity with the interior design of the vehicle. For example, the display device 10 according to the present embodiment may be disposed under the dashboard of the vehicle or built into the dashboard of the vehicle.

The display device 10 includes a light-source device 11, a light deflector 13, and a screen 15. The light-source device 11 is a device that emits the laser beams emitted from a light source outside the device. For example, the light-source device 11 may emit laser beams in which three-color laser beams of red, green, and blue (RGB) are combined. The laser beams that are emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 uses, for example, a micro-electromechanical systems (MEMS) to change the directions of travel of the laser beams. For example, the light deflector 13 is configured by a scanner such as a mirror system composed of one minute MEMS mirror that pivots around two axes orthogonal to each other or two MEMS mirrors that pivot or rotates around one axis. The laser beams emitted from the light deflector 13 scans the screen 15. The light deflector 13 is not limited to a MEMS mirror, but may be configured by a polygon mirror or the like.

The screen 15 serves as a divergent part that diverges the laser beams at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. The screen 15 forms a two-dimensional intermediate image 40 on the screen 15 as the laser beams emitted from the light deflector 13 scan the surface of the screen 15.

A method of projecting an image using the display device 10 may be implemented by a panel system or a laser scanning system. In the panel system, the intermediate image 40 is formed by an imaging device such as a liquid crystal panel, a digital micromirror device (DMD) panel (digital mirror device panel), or a vacuum fluorescent display (VFD). In the laser scanning system, the intermediate image 40 is formed by scanning the laser beams emitted from the light-source device 11, using an optical scanner.

The display device 10 according to the present embodiment adopts the laser scanning system. In particular, in the laser scanning system, since emitting/non-emitting can be assigned to each pixel, in general, a high-contrast image can be formed. In some alternative embodiments, the panel system may be adopted as the projection system in the display device 10.

The virtual image 45 is projected onto the free-form surface mirror 30 and the front windshield 50 as the intermediate image 40 that is formed by the laser beams (bundle of laser beams) emitted from the screen 15 is magnified for view. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around the rotation axis. Due to such a configuration, the free-form surface mirror 30 can adjust the reflection direction of the laser beams (bundle of laser beams) emitted from the screen 15 to change the position at which the virtual image 45 is displayed.

In the present embodiment, the free-form surface mirror 30 is designed using a commercially available optical design simulation software such that the free-form surface mirror 30 has a certain level of light-gathering power to achieve a desired image-forming position of the virtual image 45. In the display device 10, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m). The free-form surface mirror 30 may be a concave mirror or an element with a light-gathering power. The free-form surface mirror 30 is an example of an image forming optical system.

The front windshield 50 serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). For example, the transmissive reflector may be another front windshield arranged in addition to the front windshield 50. The front windshield 50 is an example of a reflector.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

Due to such a configuration as above, the laser beams (bundle of laser beams) emitted from the screen 15 are projected towards the free-form surface mirror 30, and are reflected by the front windshield 50. Accordingly, the viewer 3 can visually recognize the virtual image 45, i.e., the magnified image of the intermediate image 40 formed on the screen 15, due to the light reflected by the front windshield 50.

Figure 2:
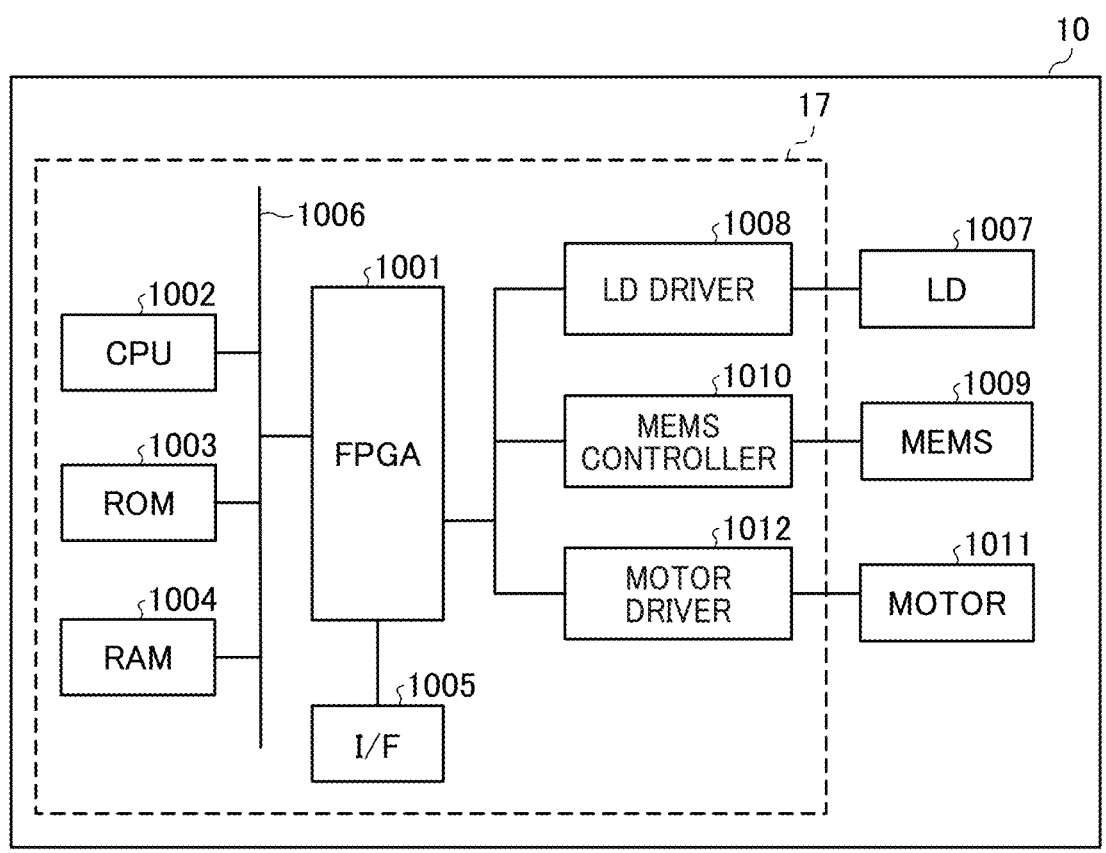
FIG. 2 is a diagram illustrating a hardware configuration of a display device according to embodiments of the present disclosure.

FIG. 2 is a diagram illustrating a hardware configuration of the display device 10 according to the present embodiment.

When necessary, some components or elements may be added to or deleted from the hardware configuration illustrated in FIG. 2.

The display device 10 includes a controller 17 that controls the operation of the display device 10. For example, the controller 17 is a circuit board or integrated circuit (IC) chip mounted inside the display device 10. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 10. The LD driver 1008, the MEMS controller 1010, and the motor driver 1012 generate a driving signal according to the control signal output from the FPGA 1001. The CPU 1002 is an integrated circuit that controls the entirety of the display device 10. The ROM 1003 is a storage device that stores a program for controlling the CPU 1002. The RAM 1004 is a storage device that serves as a work area of the CPU 1002. The interface 1005 communicates with an external device. For example, the interface 1005 is coupled to the controller area network (CAN) of a vehicle.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. The motor 1011 is an electric motor that rotates the rotation axis of the free-form surface mirror 30. The motor driver 1012 is a circuit that generates a driving signal for driving the motor 1011.

Figure 3:
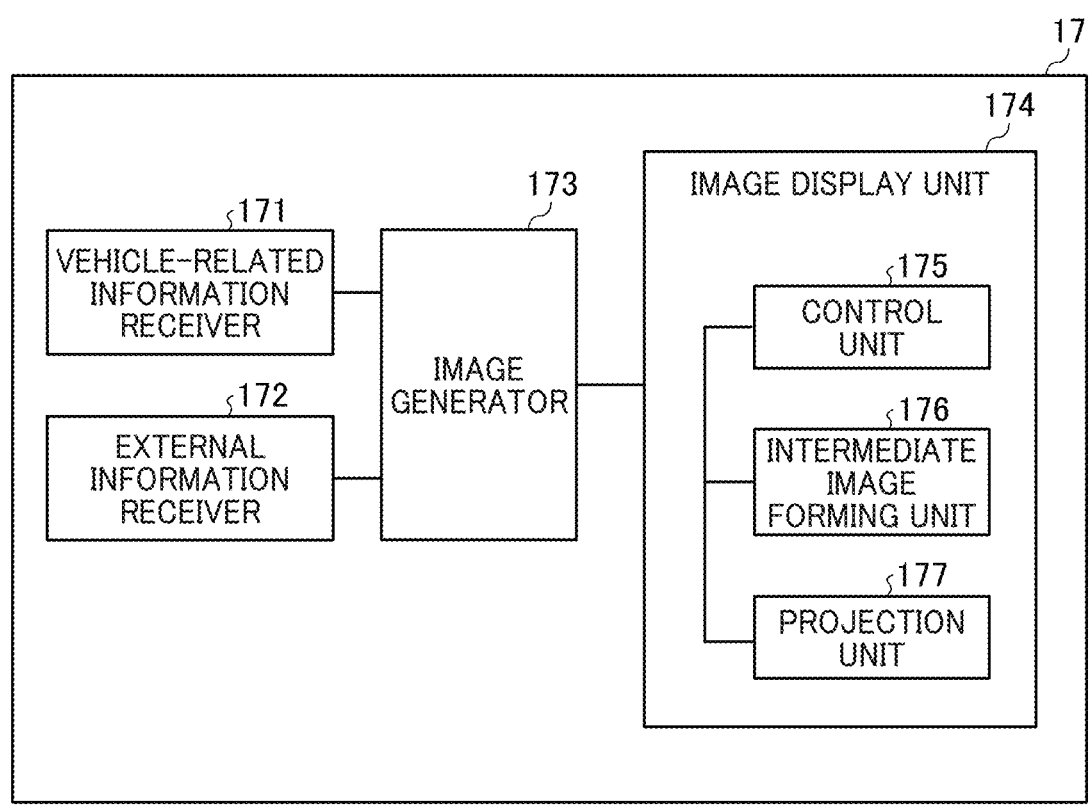
FIG. 3 is a diagram illustrating a functional configuration of a display device according to embodiments of the present disclosure.

FIG. 3 is a diagram illustrating a functional configuration of the display device 10 according to the present embodiment.

The functions that are implemented by the display device 10 include a vehicle-related information receiver 171, an external information receiver 172, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 2. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented by some of the elements illustrated in FIG. 2. In particular, the external information receiver 172 may be implemented by the interface 1005, the processing performed by the CPU 1002, and a program stored in the ROM 1003.

The image generator 173 is a function to generate image data, which is used to display the intermediate image 40 and the virtual image 45, based on the data input from the vehicle-related information receiver 171 and the external information receiver 172. For example, the image generator 173 is implemented by some of the elements illustrated in FIG. 2. In particular, the image generator 173 may be implemented by the processing performed by the CPU 1002, and a program stored in the ROM 1003.

The image display unit 174 is a function to form the intermediate image 40 on the screen 15 based on the image data generated by the image generator 173, and to project the laser beams (bundle of laser beams) that form the intermediate image 40 towards the front windshield 50 to display the virtual image 45. For example, the image display unit 174 is implemented by some of the elements illustrated in FIG. 2. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form the intermediate image 40, the control unit 175 generates a control signal used to control the operation of the light-source device 11 and the light deflector 13. Moreover, the control unit 175 generates a control signal that controls the operation of the free-form surface mirror 30 to display the virtual image 45 at a desired position.

The intermediate image forming unit 176 forms an intermediate image 40 on the screen 15 based on the control signal generated by the control unit 175. The projection unit 177 projects the laser beams that form the intermediate image 40 towards the transmissive reflector (e.g., the front windshield 50) in order to form the virtual image 45 to be visually recognized by the viewer 3.

Figure 4:
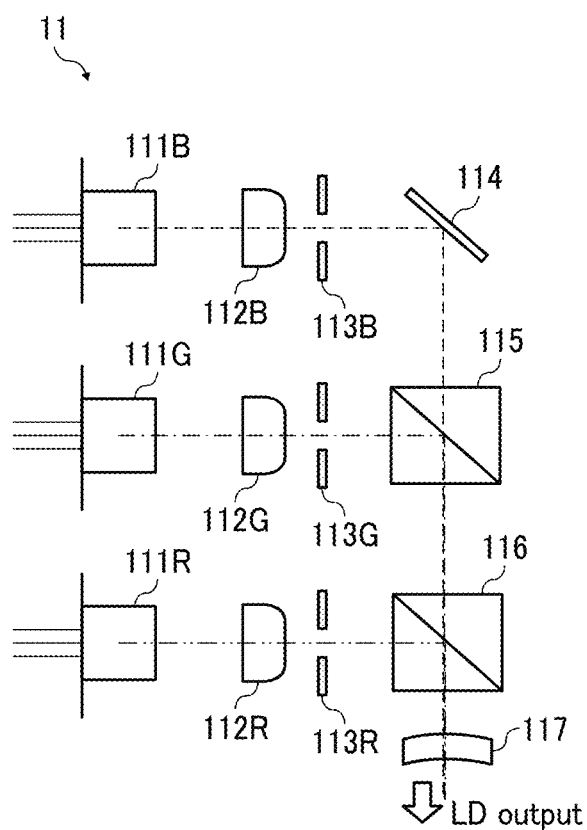
FIG. 4 is a diagram illustrating a specific configuration of a light-source device according to embodiments of the present disclosure.

FIG. 4 is a diagram illustrating a specific configuration of the light-source device 11 according to the present embodiment.

The light-source device 11 includes light-source elements 111R, 111G, and 111B (these light-source elements may be referred to simply as a light-source element 111 in the following description when it is not necessary to distinguish each of the light-source elements), coupling lenses (collimator lenses) 112R, 112G, and 112B, apertures 113R, 113G, and 113B, combiners 114, 115, and 116, and a lens 117. The light-source device 11 is an example of a light source.

For example, each of the light-source elements 111R, 111G, and 111B of three colors (red, green, and blue (RGB)) is a laser diode (LD) having a single or a plurality of light-emitting points. The light-source elements 111R, 111G, and 111B emit laser beams (light flux) having different wavelengths λR, λG, and λB, respectively. For example, λR=640 nanometers (nm), λG=530 nm, and λB=445 nm.

The emitted bundles of laser beams (light flux) are coupled and collimated by the coupling lenses 112R, 112G, and 112B, respectively. The coupled bundles of laser beams (light flux) are shaped by the apertures 113R, 113G, and 113B, respectively. The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

The laser beams (light flux) that are shaped by the apertures 113R, 113G, and 113B are combined by the three combiners 114, 115, and 116, respectively. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined bundle of laser beams (light flux) passes through the condenser lens 117 that concentrates the light towards the light deflector 13, and is guided to the light deflector 13.

Figure 5:
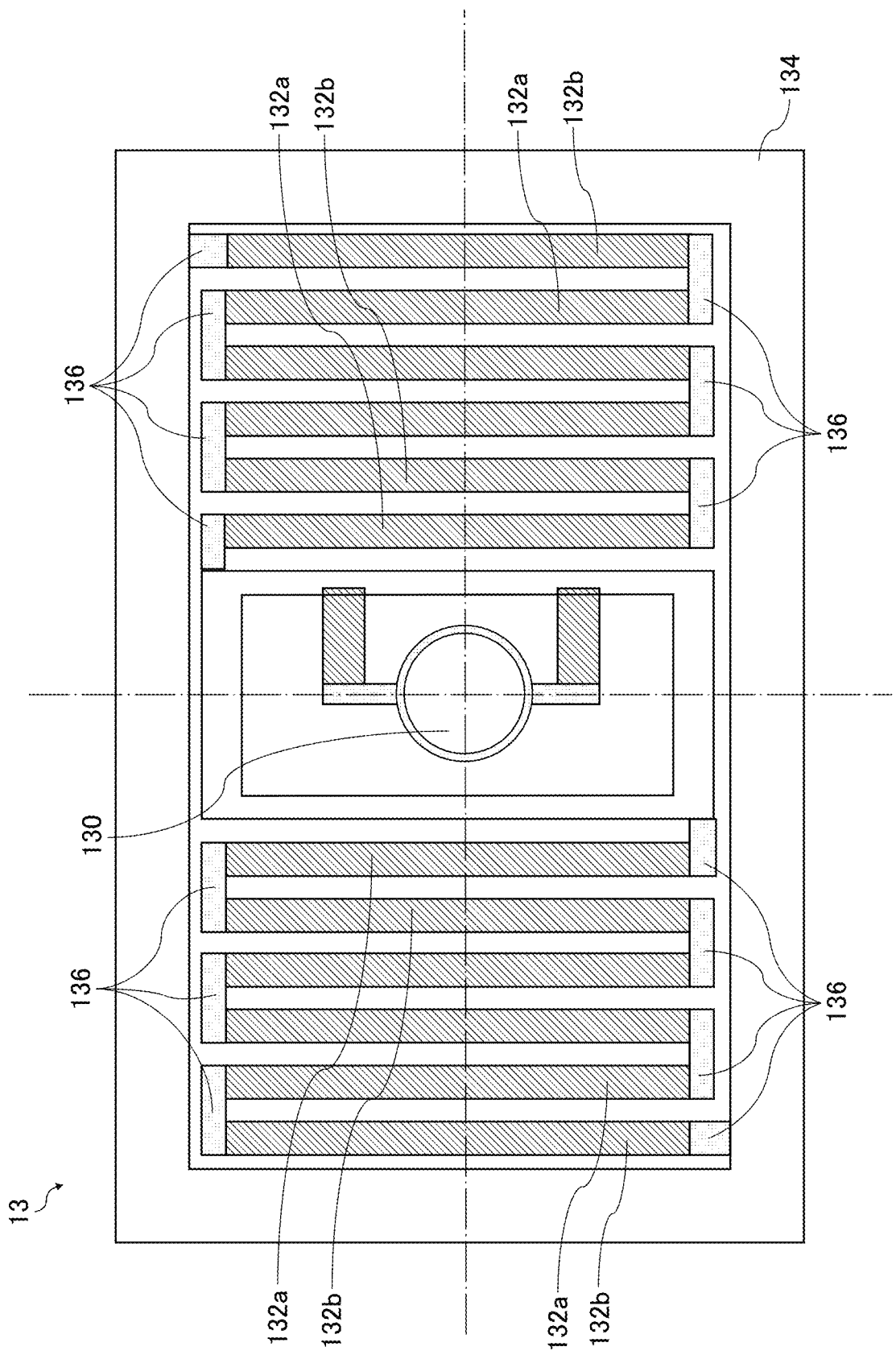
FIG. 5 is a diagram illustrating a specific configuration of a light deflector according to embodiments of the present disclosure.

FIG. 5 is a diagram illustrating a specific configuration of the light deflector 13 according to the present embodiment.

The light deflector 13 is a MEMS mirror produced by semiconductor processing, and includes a mirror 130, s plurality of pairs of first and second serpentine beams 132a and 132b, a frame 134, and a piezoelectric member 136. The light deflector 13 is an example of a scanner.

The mirror 130 has a reflection plane that reflects the laser beams emitted from the light-source device 11 towards the screen 15 side. In the light deflector 13, the pairs of first and second serpentine beams 132a and 132b are formed across the mirror 130. The pairs of first and second serpentine beams 132a and 132b that are arranged alternately have a plurality of turning portions. The pairs of first and second serpentine beams 132a and 132b are supported by the frame 134. The piezoelectric member 136 is disposed such that the first and second serpentine beams 132a and 132b, which are adjacent to each other, are coupled to each other. The piezoelectric member 136 applies different levels of voltage to the first and second serpentine beams 132a and 132b to bend each of the first and second serpentine beams 132a and 132b differently.

As a result, the first and second serpentine beams 132a and 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Figure 6:
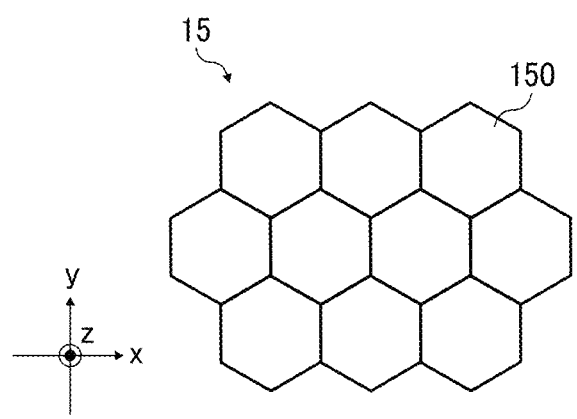
FIG. 6 is a diagram illustrating a specific configuration of a screen according to embodiments of the present disclosure.

FIG. 6 is a diagram illustrating a specific configuration of the screen 15 according to the present embodiment.

The laser beams emitted from the LD 1007 that configures a part of the light-source device 11 form an image on the screen 15. The screen 15 serves as a divergent part that diverges the laser beams at a predetermined divergence angle. As an example configuration in which a plurality of curved portions through which the light diverges are provided, the screen 15 as illustrated in FIG. 6 has a microlens-array structure in which a plurality of hexagonal-shaped microlenses 150 are arranged with no gap therebetween. The microlenses 150 are convex portions that are an example of the curved portions. The lens diameter of each one of the microlenses 150 (the distance between two sides that are opposed to each other) is about 200 micrometers (μm). As the microlenses 150 of the screen 15 have a hexagonal shape, the multiple microlenses 150 can be arrayed with high density. The microlens array 200 and the microlenses 150 according to the present embodiment will be described later in detail.

Figure 7A:
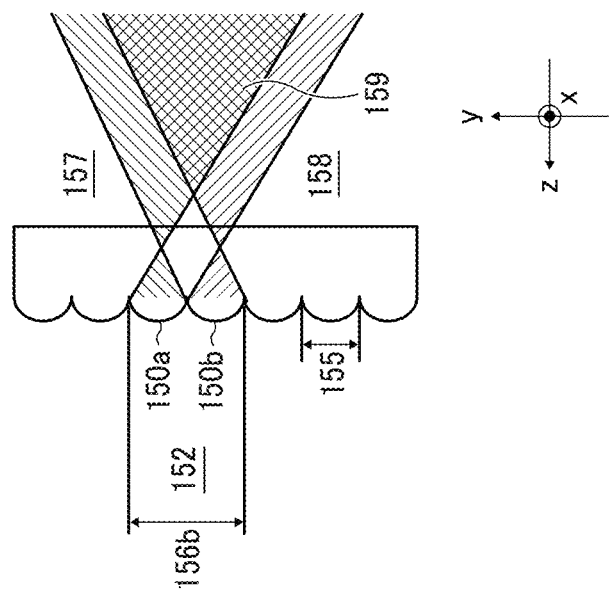
FIG. 7A and FIG. 7B are diagrams illustrating a difference in operation due to differences in sizes of the diameter of incident light flux and the lens diameter in the microlens array, according to embodiments of the present disclosure.
Figure 7B:
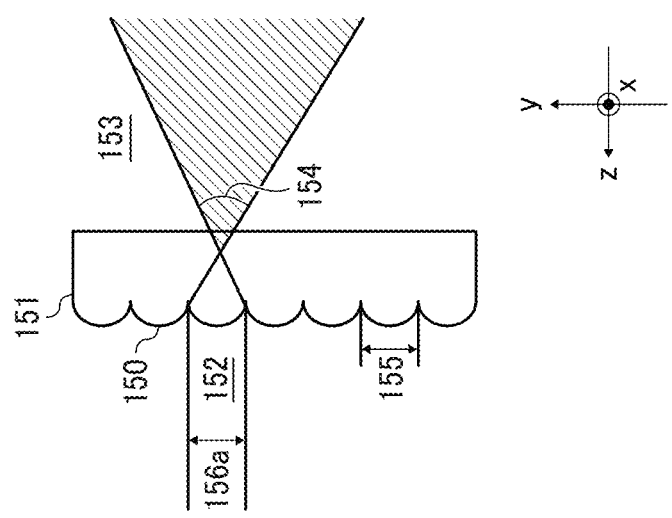

FIG. 7A and FIG. 7B are diagrams illustrating a difference in operation due to differences in sizes of the diameter of incident light flux and the lens diameter in a microlens array, according to the present embodiment.

As illustrated in FIG. 7A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150, the incident light 152 can diverge through the screen 15 at a desired divergence angle 154. The Lens diameter 155 at which the microlenses 150 are arranged is designed to be wider than the diameter 156a of the incident light 152. Accordingly, the screen 15 does not cause interference among the lenses, and interfering noise can be prevented from occurring.

FIG. 7B is a diagram illustrating the optical paths of diverging lights when the diameter 156b of the incident light 152 is twice wider than the lens diameter 155 at which the microlenses 150 are arranged. The incident light 152 is incident on two microlenses 150a and 150b, and these two microlenses 150a and 150b produce two diverging lights 157 and 158, respectively. In such cases, lights may interfere with each other as two diverging lights exist in an area 159. Such an interference between two diverging lights (coherent light) is visually recognized as an interfering noise by an observer.

In view of the above circumstances, preferably, the lens diameter 155 at which the microlenses 150 are arranged is designed to be wider than the diameter 156 of the incident light 152 in order to reduce the interfering noise. A configuration with convex lenses is described as above with reference to FIG. 7A and FIG. 7B. However, no limitation is indicated thereby, and advantageous effects can be expected in a similar manner in a configuration with concave lenses.

Figure 8:
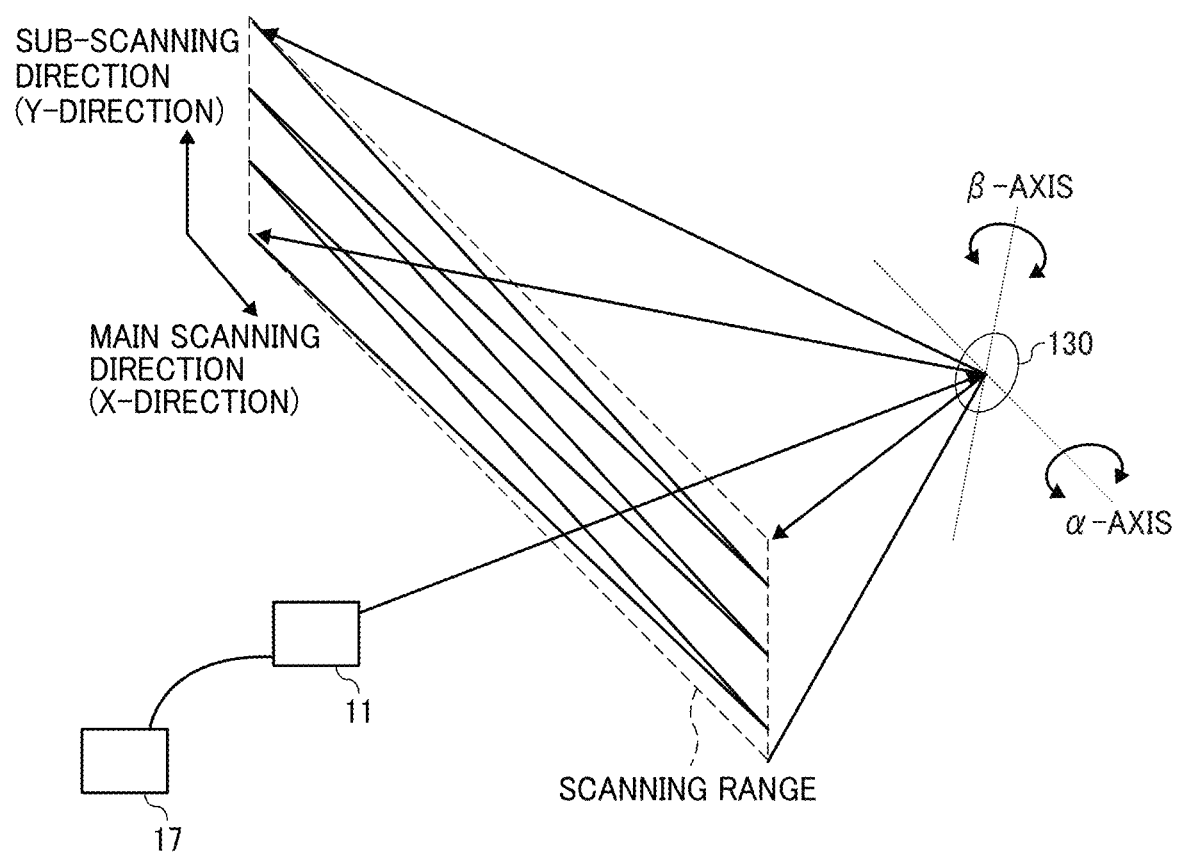
FIG. 8 is a diagram illustrating the relation between a mirror of a light deflector and the scanning range, according to embodiments of the present disclosure.

FIG. 8 is a diagram illustrating the relation between the mirror 130 of the light deflector 13 and the scanning range, according to the present embodiment.

The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 8, the laser beams that are emitted from the multiple light-source elements and whose optical paths are combined are two-dimensionally deflected about the α axis and the β axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beams scan (two-way scans) the scanning range of the screen 15 in an oscillating manner in the main scanning direction (X-axis direction) at a high frequency of about 20,000 to 40,000 hertz (Hz), and one-way scan the scanning range of the screen 15 in the sub-scanning direction (Y-axis direction) at a low frequency of about a few tens of Hz. In other words, the light deflector 13 performs raster scanning on the screen 15. In this configuration, the display device 10 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz. Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20,000 Hz and 50 Hz, respectively, the length of time to scan one frame is 20 msec.

Figure 9:
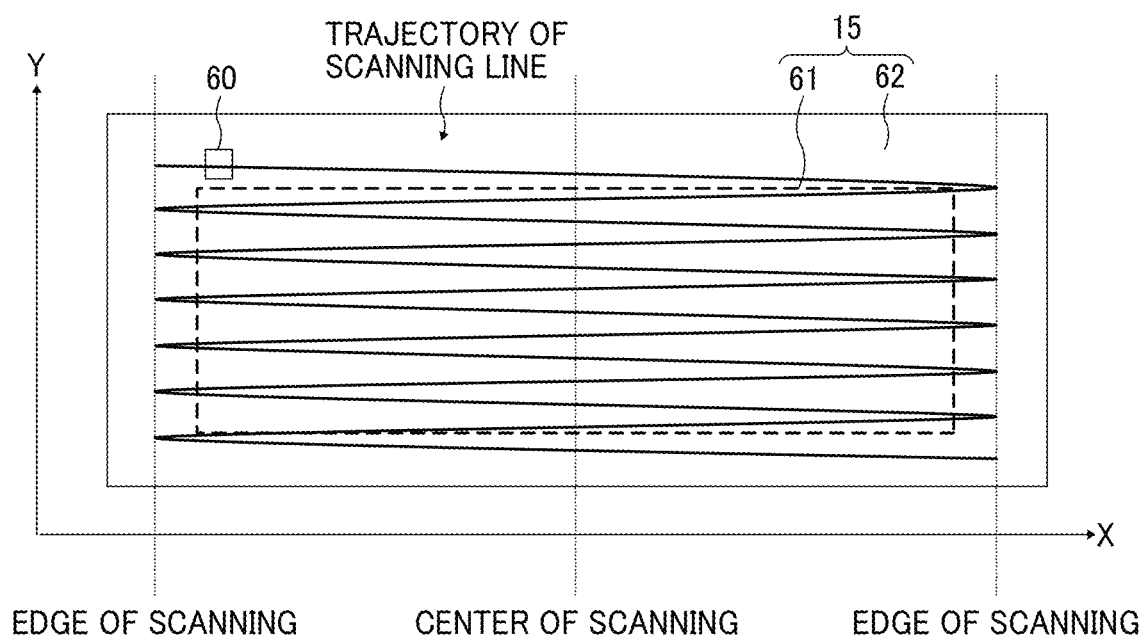
FIG. 9 is a diagram illustrating the track of a scanning line when two-dimensional scanning is performed, according to embodiments of the present disclosure.

FIG. 9 is a diagram illustrating the track of a scanning line when two-dimensional scanning is performed, according to the present embodiment.

As illustrated in FIG. 9, the screen 15 includes an image area 61 (i.e., an effective scanning area) and a frame area 62 that surrounds the image area 61. The image area 61 is irradiated with the light that is modulated according to the image data, and the intermediate image 40 is drawn on the image area 61.

In the present embodiment, the scanning range includes the image area 61 and a part of the frame area 62 (i.e., a portion around the periphery of the image area 61) on the screen 15. In FIG. 9, the track of the scanning line in the scanning range is indicated by a zigzag line. For the sake of explanatory convenience, the number of scanning lines in FIG. 9 is less than the actual number of scanning lines.

For example, the screen 15 may be configured by a transmissive optical element such as the microlens array 200 that diffuses light. In the present embodiment, the shape of the image area 61 is rectangular or planar. However, no limitation is intended thereby, and the shape of the image area 61 may be polygonal or curved. Further, in some embodiments, the screen 15 may be a reflective optical element such as a micromirror array that diffuses light, depending on the design or layout of the display device 10.

In the following description of the present embodiment, it is assumed that the screen 15 is configured by the microlens array 200.

The screen 15 is provided with a synchronous detection system 60 that includes a light receiver disposed at the edges of the image area 61 (a part of the frame area 62) in the scanning range. In FIG. 9, the synchronous detection system 60 is disposed on the −X and +Y side of the image area 61. More specifically, the synchronous detection system 60 is disposed at a corner on the +Y side. The synchronous detection system 60 detects the operation of the light deflector 13 and outputs, to the FPGA 1001, a synchronizing signal that determines the start timing of scanning or the end timing of scanning.

A configuration of the display device 10 according to the present embodiment is described below in detail with reference to FIG. 10 to FIG. 21. Firstly, the relation between the microlenses 150 and an eye box 47 are described with reference to FIG. 10 to FIG. 14.

Figure 10:
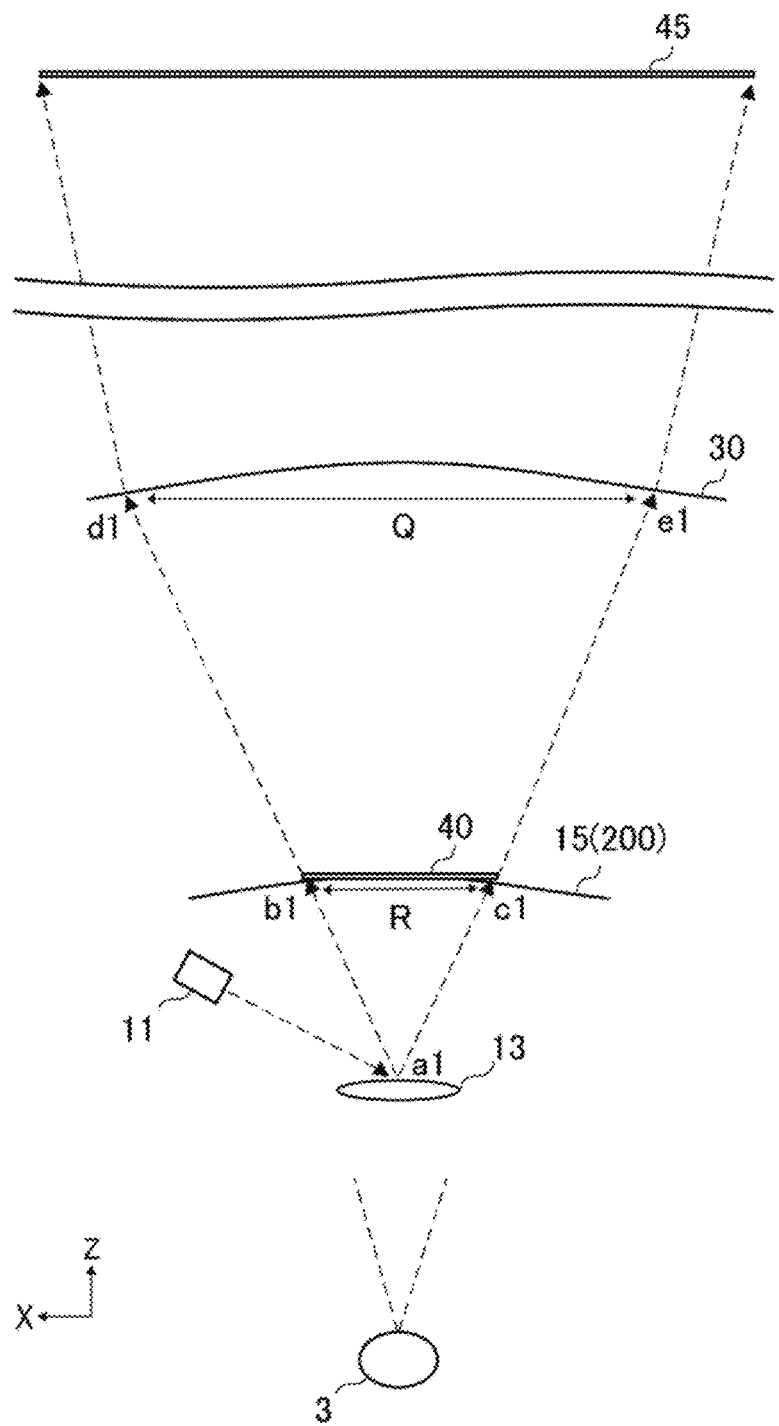
FIG. 10 is a schematic diagram illustrating the relative positions of the elements in a display system according to embodiments of the present disclosure.

FIG. 10 is a schematic diagram illustrating the relative positions of the elements in a display system according to the present embodiment.

For the sake of explanatory convenience, it is assumed in FIG. 10 that the elements of the system are arranged in parallel on the XZ plane. However, no limitation is indicated thereby, and in actuality, it is not necessary for the elements of the system to be arranged parallel to the XZ plane as illustrated in FIG. 1.

The bundles of laser beams generated by the light-source device 11 are incident on the point a1 of the light deflector 13, and are two-dimensionally scanned on the screen 15 as deflected by the light deflector 13. The screen 15 forms the intermediate image 40 with a width R in the X-axis direction (main scanning direction).

When the intermediate image 40 at an edge in the +X-direction is to be formed, the bundles of laser beams emitted from the light-source device 11 are deflected by the light deflector 13 in the +X-direction, and a portion of the intermediate image 40 is drawn at a point b1. When the intermediate image 40 at an edge in the −X-direction is to be formed, the bundles of laser beams emitted from the light-source device 11 are deflected by the light deflector 13 in the −X-direction, and a portion of the intermediate image 40 is drawn at a point c1. The image that is drawn on the screen 15 is configured by the image generator 173 of the controller 17.

The screen 15 is configured by the microlens array 200. The bundles of laser beams that scan the screen 15 diverge at a predetermined divergence angle as passing through the microlens array 200. In FIG. 10, each of the laser beams that are emitted from the microlens array 200 indicates the central light beam of the diverging light. The bundles of laser beams that are emitted from the microlens array 200 are incident on the free-form surface mirror 30. Q denotes the band pass of the bundles of laser beams on the free-form surface mirror 30.

When an image at an edge in the +X-direction is to be formed in such a configuration as above, the central light beam of the diverging light is incident on a point d1 of the free-form surface mirror 30. When an image at an edge in the −X-direction is to be formed in such a configuration as above, the central light beam of the diverging light is incident on a point e1 of the free-form surface mirror 30.

The plane of the free-form surface mirror 30 is designed and shaped so as to reduce the optical strain that occurs on the front windshield 50 as. The bundles of laser beams that have passed through the free-form surface mirror 30 are then incident on the front windshield 50, and reach at least one point of the location of the eyepoint within an eyelips area including the reference eyepoint of the viewer 3. The bundles of laser beams that are incident on the front windshield 50 are reflected according to the shape of the surface of the front windshield 50.

For example, in the display system 1 as illustrated in FIG. 1, the viewer 3 (for example, the driver who drives a car) visually recognizes the virtual image 45 in an eye box (i.e., an area near the eyes of the viewer 3) on the optical path of the light that is reflected by the front windshield 50. Here, the term "eye box" indicates the area in which the viewer 3 can visually recognize the virtual image 45 without adjusting the location of the eyepoint. In particular, the range of the eye box 47 is equal to or less than "the eye range of a car driver" (Japanese Industrial Standards (JIS) D 0021). The eye box 47 is set as the area through which the driver can visually recognize the virtual image 45, based on the eye-lip that is a region of space in which the eyepoint of the driver seated on a seat can exist.

The relation between the microlens array 200 that configures the screen 15 and an eye box is described below with reference to FIG. 11.

Figure 11:
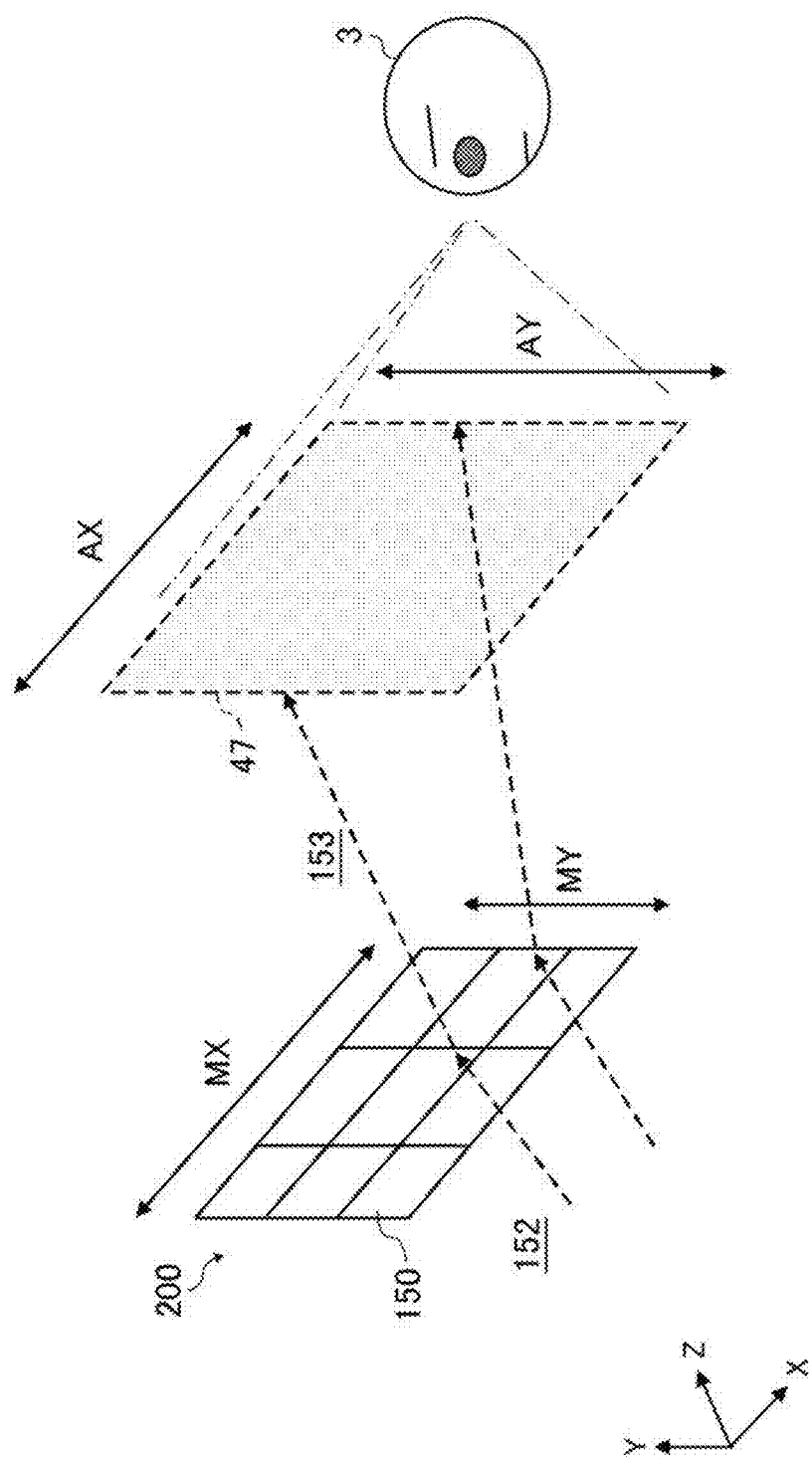
FIG. 11 is a diagram illustrating the relation between a microlens array and an eye box, according to embodiments of the present disclosure.

FIG. 11 is a diagram illustrating the relation between the microlens array 200 and the eye box 47, according to the present embodiment.

For the sake of explanatory convenience, the elements that are arranged on the optical path after the microlens array 200 are omitted in FIG. 11, and the space between the microlens array 200 and the viewer 3 is linearly expressed.

As illustrated in FIG. 8, the microlens array 200 as illustrated in FIG. 11 includes the multiple microlenses 150 that are arrayed in a two-dimensional region. The incident light 152 that contains the image data is incident on the multiple microlenses 150 that make up the microlens array 200. The viewer 3 can visually recognize a display image that includes prescribed items of information, on a region (i.e., the eye box 47) where the diverging light 153 that diverges as passing through each of the microlenses 150 can visually be recognized.

In the present embodiment, the Y-axis direction (i.e., the vertical direction) of the eye box 47 is perpendicular to the line of sight of the viewer 3 such as the driver of a car. On the other hand, the X-axis direction (i.e., the horizontal direction) of the eye box 47 is in a horizontal direction perpendicular to a direction orthogonal to the line of sight of the viewer 3.

Further, when the radius of curvature of the microlenses 150 is constant in both the X-axis direction and the Y-axis direction, the shape of the diverging light 153 from one of the microlenses 150, i.e., the shape of the eye box 47, corresponds to the shape of the corresponding one of the microlenses 150. In other words, the shape of the microlenses 150 is to be designed according to a desired shape of the eye box 47 (visually-recognizable area).

FIG. 12 is a diagram illustrating the relation between the intermediate image 40 and the virtual image 45, according to the present embodiment.

The intermediate image 40 is formed as the laser beams emitted from the light deflector 13 the surface of the screen 15. The virtual image 45 is an image that the viewer 3 can visually identify as the projection light projected from the display device 10 is reflected by the front windshield 50.

The intermediate image 40 that is formed on the screen 15 is magnified and projected towards the front windshield 50. In other words, the shape of the intermediate image 40 is similar to the shape of the virtual image 45. For example, in the case of FIG. 12, the width W and the height H of the virtual image 45 is a magnified image of the width w and the height h of the intermediate image 40.

The relation between the shape of microlenses and the shape of an eye box is described below with reference to FIG. 13A, FIG. 13B, and FIG. 14. In the following description, it is assumed that the radius of curvature of the microlenses 150 is constant in both the X-axis direction and the Y-axis direction.

Figure 13A:
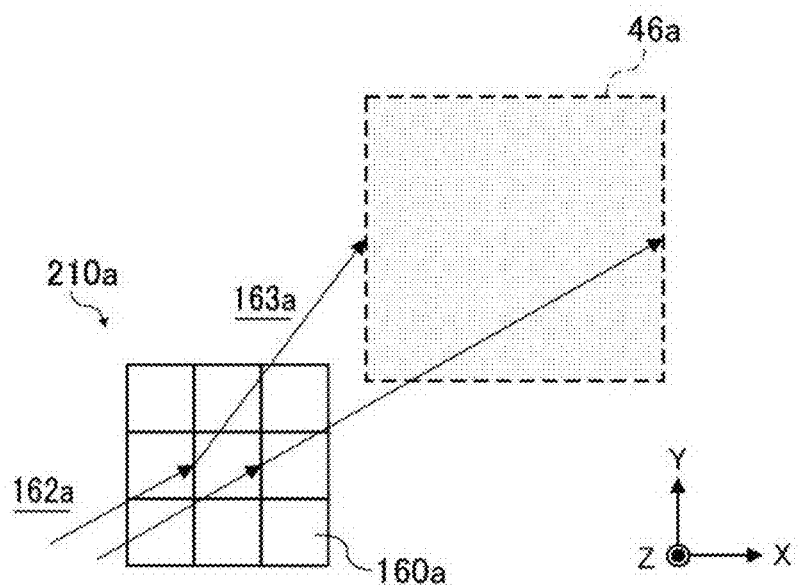
FIG. 13A and FIG. 13B are schematic diagrams each illustrating the relation between the shape of microlenses and the shape of an eye box, according to a control sample.
Figure 13B:
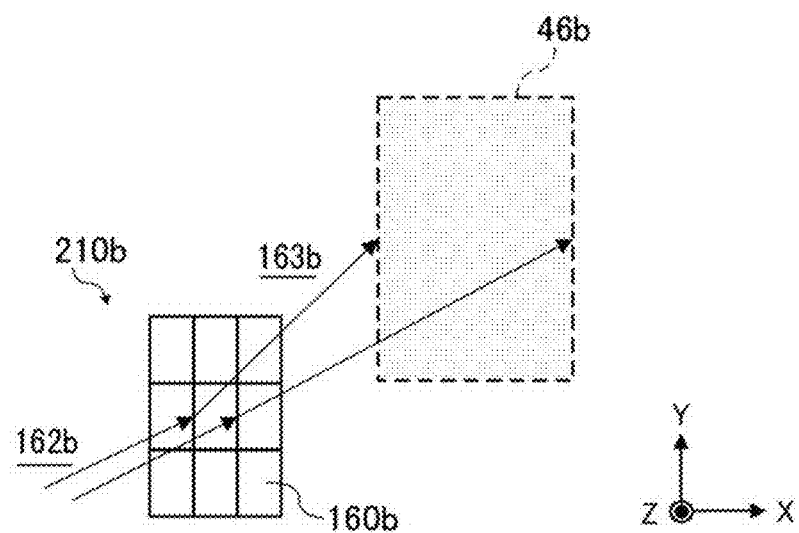

FIG. 13A and FIG. 13B are schematic diagrams each illustrating the relation between the shape of microlenses and the shape of an eye box, according to a control sample.

FIG. 13A is a diagram illustrating how the incident light 152 incident on the microlenses 160a each of which is in a square shape in a planar view diverges as passing through the microlenses 160a and an eye box 46a is formed by the diverging light 153. As described above with reference to FIG. 11, the eye box 46a is square-shaped as the shape of the eye box 46a matches the shape of the microlenses 160a.

FIG. 13B is a diagram illustrating how the incident light 152 incident on the microlenses 160b each of which is a vertically-elongated rectangle in a planar view diverges as passing through the microlenses 160b and is a diagram illustrating how an eye box 46b is formed by the diverging light 153. In a similar manner to FIG. 13A, the shape of the eye box 46b is a vertically oriented rectangle as the shape of the eye box 46a matches the shape of the microlenses 160b.

For example, when the display system 1 as illustrated in FIG. 1 is used as a mobile object such as a car, the X-axis direction indicates the horizontal direction and the Y-axis direction indicates the vertical direction when viewed from the driver's seat. In this configuration, the display device 10 displays, for example, a navigation image ahead of the front windshield 50 as the virtual image 45. Accordingly, the viewer 3 who is the driver can observe such a navigation image without moving his/her line of vision away from the ahead of the front windshield 50 while staying in the driver's seat. In such a configuration, the front windshield 50 is horizontally oriented, and thus it is desired that the virtual image 45 be horizontally oriented when viewed from the driver. In other words, preferably, each of the intermediate image 40 formed on the microlenses and the virtual image 45 has a larger angle of view in the X-axis direction.

It is also desired that the viewing angle be wider in the horizontal direction (X-axis direction) than in the vertical direction (Y-axis direction) such that the driver (i.e., the viewer 3) can recognize the displayed image even in a slanting direction from the right and left sides. Accordingly, a greater divergence angle (anisotropic diffusion) is required for the X-axis direction (i.e., the horizontal direction) of the virtual image 45 compared with the divergence angle (anisotropic diffusion) in the Y-axis direction (vertical direction). In other words, in the display device 10, the range in the X-axis direction (i.e., the horizontal direction) of the eye box 47 needs to be configured wider than the range in the Y-axis direction (vertical direction).

However, the length in the X-axis direction (i.e., the horizontal direction) of the eye boxes 46a and 46b according to the control sample as illustrated in FIG. 13A and FIG. 13B is equal to or shorter than the length in the Y-axis direction (i.e., the vertical direction) of the eye boxes 46a and 46b. Accordingly, the brightness of the image that is to be visually recognized by the viewer 3 deteriorates as the visually-recognizable area in the vertical direction needs to be expanded to secure the visually-recognizable area in the horizontal direction where the viewpoint of the driver (i.e., the viewer 3) can easily be moved.

In order to handle such a situation, in the display device 10 according to the present embodiment, the microlens array 200 is arranged such that the major (longer) axis direction of the microlenses 150 matches the major (longer) axis direction of the eye box 47.

Figure 14:
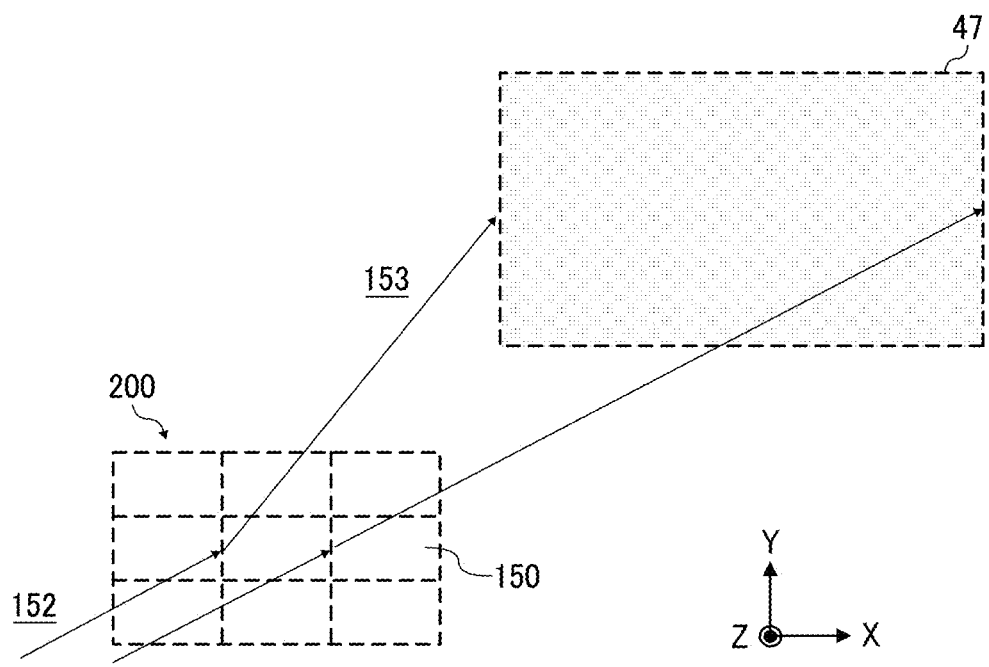
FIG. 14 is a diagram illustrating the relation between the shape of microlenses and the shape of an eye box, according to embodiments of the present disclosure.

FIG. 14 is a diagram illustrating the relation between the shape of microlenses and the shape of an eye box, according to the present embodiment.

The microlenses 150 according to the present embodiment are in a horizontally-oriented shape that corresponds to the shape of the horizontally-oriented eye box 47. As illustrated in FIG. 14, each of the microlenses 150 has a horizontally-oriented rectangular shape in which the sides in the X-axis direction (horizontal direction) are long and the sides in the Y-axis direction (vertical direction) are short. As the microlenses 150 of such a shape as above is adopted in the display device 10, the range in the X-axis direction of the eye box 47 that is formed by the diverging light 153 that diverges as passing through the microlenses 150 can be made wider than the range in the Y-axis direction to achieve a horizontally-oriented shape.

In the embodiment, the X-axis direction (i.e., the horizontal direction) of the microlenses 150 and the eye box 47 is in the major (longer) axis direction, and the Y-axis direction (i.e., the vertical direction) is in the minor (shorter) axis direction. The major (longer) axis direction of the eye box 47 is in a direction orthogonal to the line of sight of the viewer 3. On the other hand, the minor (shorter) axis direction of the eye box 47 is in a horizontal direction perpendicular to a direction orthogonal to the line of sight of the viewer 3. The major (longer) axis direction of the microlenses 150 is the direction in which the diverging light 153 is emitted, which correspond to the range in the major (longer) axis direction of the eye box 47.

When the major (longer) axis direction of the microlenses 150 matches the major (longer) axis direction of the eye box 47 as described above, those two major (longer) axis direction (axial direction) are not necessarily parallel with each other in a strict sense. Instead, a predetermined level of utilization efficiency of light is maintained, and the range or shape of the diverging light 153 that diverges as passing through of the microlenses 150 is matched with the range or shape of the eye box 47. In other words, there may be a predetermined level of displacements in angle ranging from several degrees to several tens of degrees between the major (longer) axis direction of the microlenses 150 and the major (longer) axis of the eye box 47.

As described above, in the display device 10, the light diverges to a minimum area that satisfies the desired angle of view to improve the utilization efficiency of light. Due to this configuration, the brightness of the image that is to be visually recognized by the viewer 3 improves. The microlenses 150 are an example of a plurality of microlenses, and the microlens array 200 is an example of an optical element.

The lens array of the microlens array 200 are described below with reference to FIG. 15A, FIG. 15B, and FIG. 15C.

Figure 15A:
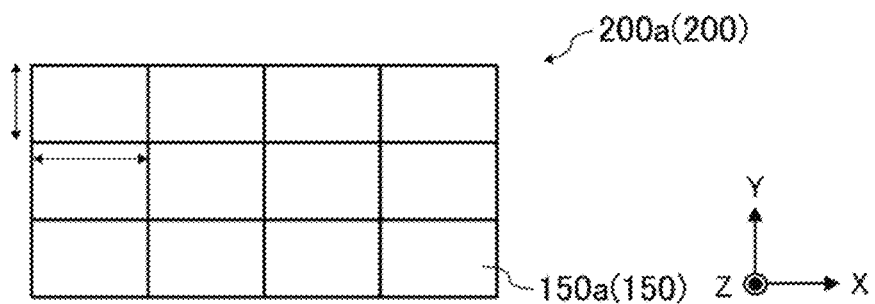
FIG. 15A, FIG. 15B, and FIG. 15C are diagrams each illustrating the arrangement of microlenses in a microlens array, according to embodiments of the present disclosure.
Figure 15B:
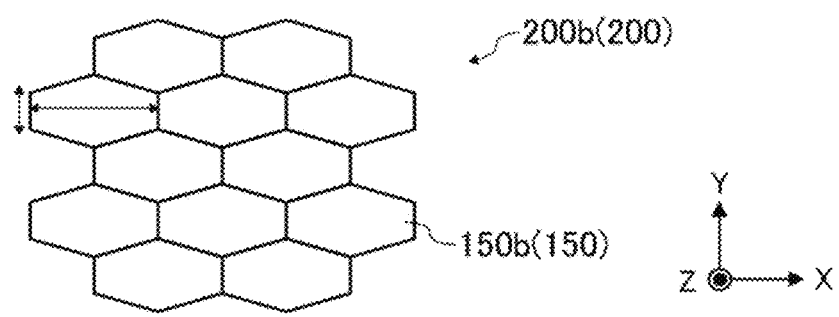
Figure 15C:
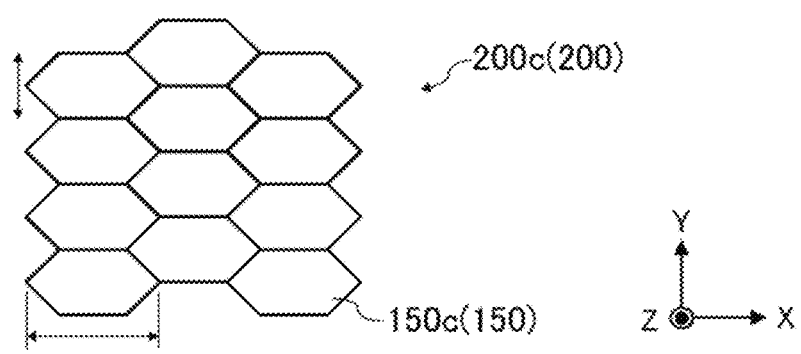

FIG. 15A, FIG. 15B, and FIG. 15C are diagrams each illustrating the arrangement of the microlenses 150 in the microlens array 200, according to the present embodiment.

As illustrated in FIG. 14, the microlens array 200 as illustrated in FIG. 15A, FIG. 15B, and FIG. 15C is configured by the arrayed multiple microlenses 150 where the length in the X-axis direction (horizontal direction) is longer than the length in the Y-axis direction (vertical direction). In the display device 10, the microlens array 200 as illustrated in FIG. 15A, FIG. 15B, and FIG. 15C is used to form the horizontally-oriented eye box 47.

In FIG. 14, the microlens array 200a as illustrated in FIG. 15A in which the horizontally-oriented rectangular microlenses 150a are arranged in a planar view is described by way of example. However, no limitation is indicated thereby, and a similar configuration may be applied to other kinds of microlens array with different lens patterns or lens arrays. For example, the configurations according to the present embodiment may be applied to the microlens arrays 200b and 200c as illustrated in FIG. 15B and FIG. 15C where the hexagonal microlenses 150b and 150c, which are horizontally-oriented in a planar view, are arranged, respectively.

In the microlens array 200b as illustrated in FIG. 15B, a horizontally-oriented hexagonal microlenses 150b are densely arranged. The microlenses 150b do not have any side parallel to the X-axis direction (i.e., the horizontal direction). In other words, the upper sides and lower sides of the microlenses 150b arranged in the X-axis direction (horizontal direction) draw zigzag lines. The arrangement of the microlens array 200b is referred to as a zigzag-type array.

In the microlens array 200c as illustrated in FIG. 15C, a horizontally-oriented hexagonal microlens 152c are densely arranged. Each one of the microlenses 150c as illustrated in FIG. 15C has a side parallel to the X-axis direction (i.e., the horizontal direction). The arrangement of the microlens array 200c is referred to as an armchair-type array. Moreover, the zigzag-type array and the armchair-type array may collectively be referred to as a honeycomb-type array.

When the lens pitch of the microlenses is shortened in the present embodiment, the resolution of the image increases. Due to this configuration, preferably, the microlens array 200b or 200c in honeycomb arrangement, as illustrated in FIG. 15B or FIG. 15C, is used in the display device 10.

As illustrated in FIG. 13A, FIG. 13B, and some other drawings, preferably, the length of the microlenses 150 in the X-axis direction (i.e., the horizontal direction) is shorter than the pitches of lighting dots of the high-power plotted dots. In other words, the distance between each pair of the neighboring high-power plotted dots is shorter than the length of the microlenses 150 in the major (longer) axis direction. Due to this configuration, at least one high-power plotted dot can be formed by the multiple microlenses 150. Accordingly, in the display device 10, the variations in light intensity can be reduced on each one of the multiple microlenses 150, and the variations in brightness on the entire image can also be reduced.

Further, when the length of lights-out time (i.e., the width of a zero-power dot) is to be increased in order to increase the fading rate, the lens diameter of the microlenses 150 in the main scanning direction needs to be lengthened. The resolution of the image that is to be visually recognized by the viewer 3 depends on the total number of the microlenses 150, and the resolution increases as the total number of microlenses is larger. Due to this configuration, in addition to the configuration in which the intensity of the light emitted from the light source is changed while the multiple microlenses 150 are being scanned, it is desired that the lens diameter in the sub-scanning direction be shorter than the lens diameter in the main scanning direction.

As illustrated in FIG. 15A, FIG. 15B, and FIG. 15C, in the microlens array 200 with the multiple microlenses 150 in which the lens diameter in the main scanning direction is wider than the lens diameter in the sub-scanning direction, the intensity of the light that is emitted from the light source can easily be changed while the multiple microlenses 150 are being scanned. In other words, at least one high-power plotted dot and at least one low-power plotted dot (or zero-power dots) can easily be formed on the multiple microlenses 150. Accordingly, in the display device 10, the fading rate can be increased while preventing the variations in brightness and the reduction in resolution from occurring.

In the display device 10, it is desired that the microlens array 200 be arranged such that the main scanning direction of the light deflector 13 is matched with the major (longer) axis direction of the microlenses 150 in order to improve the utilization efficiency of light in the horizontally-oriented eye box 47. Moreover, as described above, preferably, the pitch of the two scanning lines in the sub-scanning direction is shorter than both the lens diameter of the microlenses 150 in the Y-axis direction (i.e., the minor (shorter) axis direction) and the beam diameter in the sub-scanning direction. Due to this configuration, in the display device 10, moire on the image that is to be visually recognized by the viewer 3 can be reduced to improve the image quality.

Further, it is desired that the microlens array 200b in armchair arrangement as illustrated in FIG. 15B be used in the display device 10 in order to enhance the effect of decreasing moire. Theoretically, when the direction of the scanning line is close to the direction in which the vertices of lenses are arranged, the shape of moire significantly changes due to a slight variation between the scanning line and the direction of the lens array. This is because, for example, the shape of moire changes from the center to periphery of the image and the viewability of the image deteriorates when the shape of the scanning line changes on the surface of the image. When the moire caused by the direction of the scanning line and the direction of the lens array is taken in consideration, in the microlenses 150c of zigzag type as illustrated in FIG. 15C, the direction of the scanning line and the vertices of lenses matches the direction of the lens array in which the vertices of lenses are connected. For this reason, the cycle of moire significantly changes due to a slight angular variation between the direction of the scanning line and the direction of the lens array, and moire easily occurs. By contrast, the direction of the scanning line does not match the direction of the lens array in the armchair-type microlenses 150b as illustrated in FIG. 15B. In such a configuration, the shape of moire does not significantly change even if an angular variation is caused between the direction of the scanning line and the direction of the lens array, and moire does not occur.

Figure 16A:
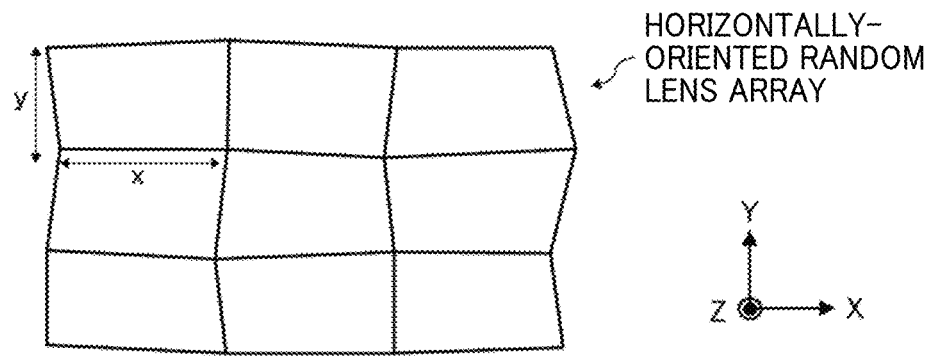
FIG. 16A, FIG. 16B, and FIG. 16C are diagrams each illustrating a concrete example of a horizontally-oriented random lens array, according to embodiments of the present disclosure.
Figure 16B:
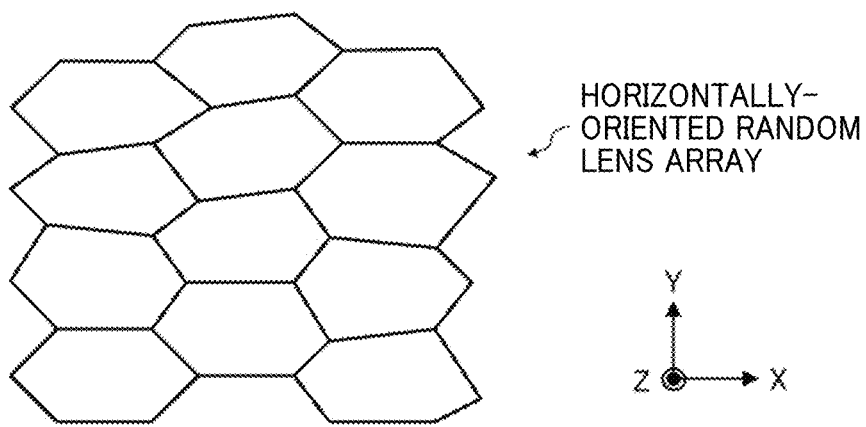
Figure 16C:
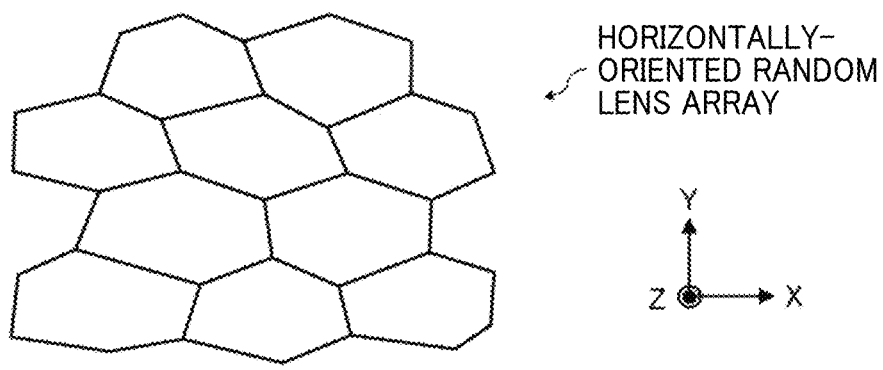

FIG. 16A, FIG. 16B, and FIG. 16C are diagrams each illustrating a concrete example of a random lens array that includes a plurality of horizontally-oriented microlenses (such a random lens array may be referred to as a horizontally-oriented random lens array in the following description), according to the present embodiment.

In the following description, the microlens array 200 according to the present embodiment that includes the horizontally-oriented microlenses 150 will be referred to as a horizontally-oriented random lens array. The horizontally-oriented random lens arrays as illustrated in FIG. 16A has structure based on a periodic lens array, in which a plurality of rectangular microlenses are arranged in a matrix. Each microlens of such periodic lens arrays has a horizontally oriented aspect ratio, and the relation "x>y" holds true.

The horizontally-oriented random lens array as illustrated in FIG. 16B has structure based on a periodic lens array, in which a plurality of horizontally-oriented hexagonal microlenses are arranged in a zigzag-type array. The horizontally-oriented random lens array as illustrated in FIG. 16C has structure based on a periodic lens array, in which a plurality of horizontally-oriented hexagonal microlenses are arranged in an armchair-type array. In the horizontally-oriented random lens arrays as illustrated in FIG. 16A, FIG. 16B, and FIG. 16C, the lens pitches and the directions of the boundaries of lenses are randomized, and thus the interfering noise with regular pitches can be prevented from occurring.

Figure 17A:
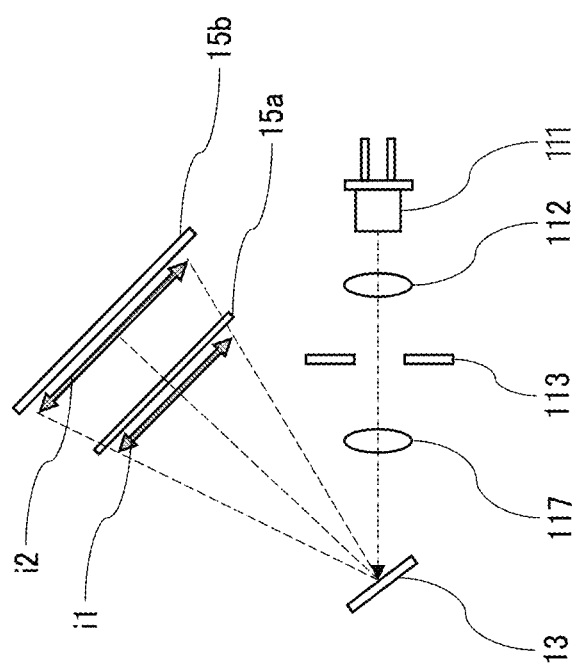
FIG. 17A and FIG. 17B are schematic diagrams each illustrating the relative positions of the elements in a display system according to embodiments of the present disclosure.
Figure 17B:
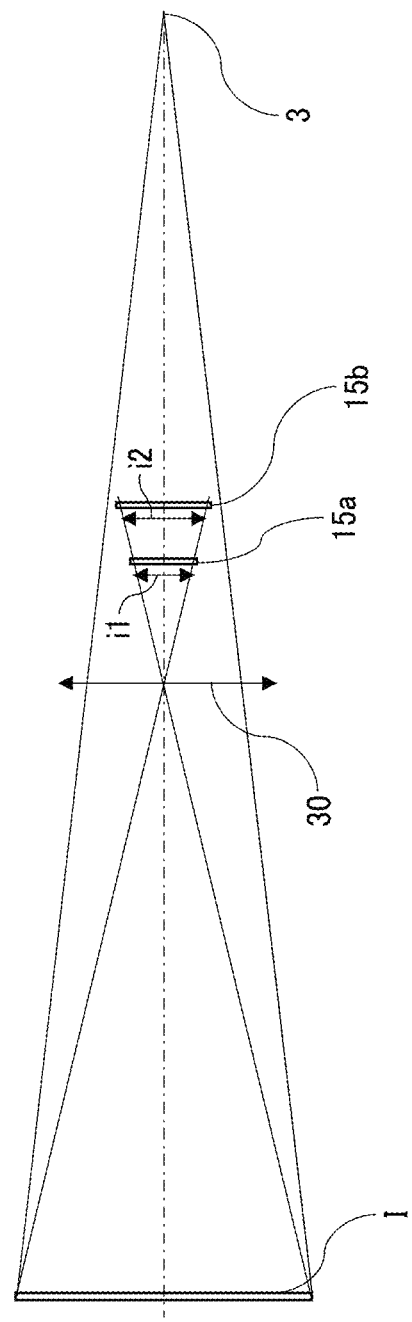

FIG. 17A and FIG. 17B are schematic diagrams each illustrating the relative positions of the elements in the display system 1, according to the present embodiment.

For the sake of explanatory convenience, it is assumed in FIG. 17A and FIG. 17B that the elements of the system are arranged on the same plane. However, no limitation is indicated thereby, and in actuality, it is not necessary for the elements of the system to be arranged on the same plane as illustrated in FIG. 1.

As illustrated in FIG. 17A, the bundles of laser beams (light flux) that are emitted from the light-source element 111 are coupled and collimated by the coupling lens 112. Then, the coupled bundles of laser beams (light flux) are shaped by the aperture 113, and are guided to the light deflector 13 as passing through the condenser lens 117 that concentrates the light towards the light deflector 13.

As illustrated in FIG. 17A, "i1" denotes the size of the display image (intermediate image) on a screen 15a when the distance between the light deflector 13 and the screen 15 is shortened, and "i2" denotes the size of the display image on a screen 15b when the distance between the light deflector 13 and the screen 15 is expanded. In the present embodiment, it is assumed that the angle of view of the virtual image I that is visually recognized from the viewpoint of the viewer 3 and the position of the free-form surface mirror 30, as illustrated in FIG. 17B, are fixed.

When the distance between the light deflector 13 and the screen 15 is shortened, the distance between the light-source element 111 and the screen 15a is shortened. In such a configuration, the numerical aperture (NA) on the screen 15a on the image side is broadened, and the beam spot diameter can be shortened.

On the other hand, when the distance between the light deflector 13 and the screen 15 is lengthened, the distance between the light-source element 111 and the screen 15a is lengthened. In such a configuration, the numerical aperture (NA) on the screen 15b on the image side shrinks unintentionally, and the beam spot diameter is widened unintentionally.

As illustrated in FIG. 17B, when the size of the display image is as indicated by "i1," the magnifying power of the observation optical system is high. For this reason, the lens pitch on the screen 15a needs to be shortened in order to achieve a certain level of resolution at the viewpoint of the viewer 3.

By contrast, when the size of the display image is as indicated by "i2," the magnifying power of the observation optical system is low. For this reason, a certain level of resolution can be achieved at the viewpoint of the viewer 3 even if the lens pitch of the screen 15b is wide. In view of reduction in size, the arrangement of the screen 15a where the optical-path length is short is advantageous to both the display device 10 and the observation optical system.

Figure 18:
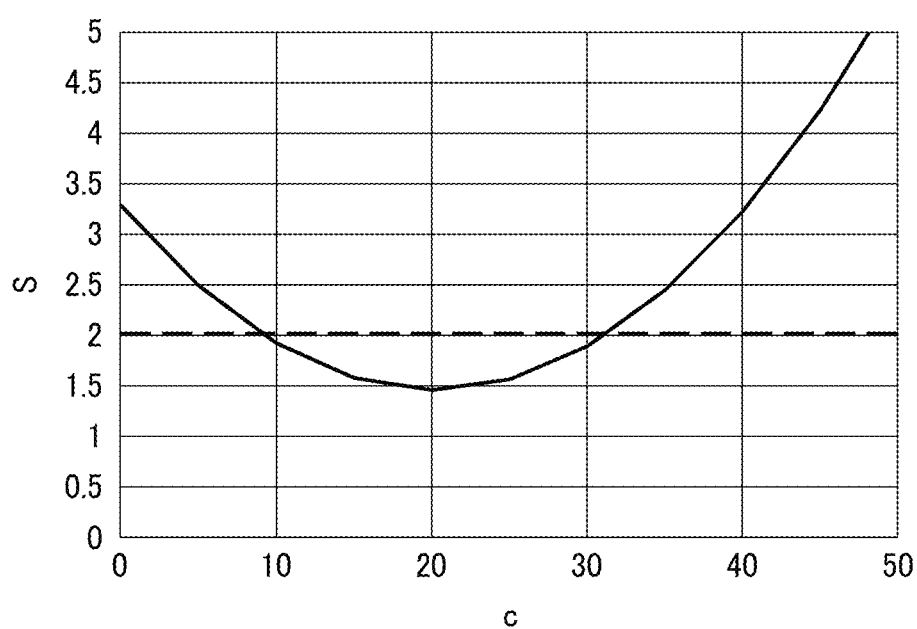
FIG. 18 is a diagram illustrating the relation between a beam spot diameter and a lens diameter, according to embodiments of the present disclosure.

FIG. 18 is a diagram illustrating the relation between the beam spot diameter and the lens diameter, according to the present embodiment.

More specifically, FIG. 18 is a diagram illustrating the relation between the beam spot diameter and the lens diameter when the effective diameter of the mirror of the light deflector 13 is 1.25 millimeters (mm), according to the present embodiment.

Due to the dependency as illustrated in FIG. 17A and FIG. 17B, "Beam Spot Diameter/Lens Diameter" depends on the image size I of the virtual image 45 and the effective diameter a of the mirror of the light deflector 13, and there is a tendency as indicated by a first equation as given below.
S: Diameter 156 of Incident Light 152/Lens Diameter 155 of Microlenses 150
a: Effective Diameter of Mirror of Light Deflector 13 for Intermediate Image i
c: Image Size I of Virtual Image 45 in Sub-scanning Direction/Effective Diameter a $$S=0.007a^{-2}c^2+0.75a^{-0.75}c+0.5a^{-0.5}$$ First Equation As illustrated in FIG. 7B, it is desired that the value of "Beam Spot Diameter/Lens Diameter" be equal to or less than two. For this reason, based on the first equation, preferably, the relation between the effective diameter "a" of the mirror of the light deflector 13 for the intermediate Image "i" and the ratio "c" of the image size I of the virtual image 45 to the effective diameter "a" is as indicated by a second equation given below.

$$2 \geq 0.007a^{-2}c^2+0.75a^{-0.75}c+0.5a^{-0.5}$$ Second Equation

Figure 19A:
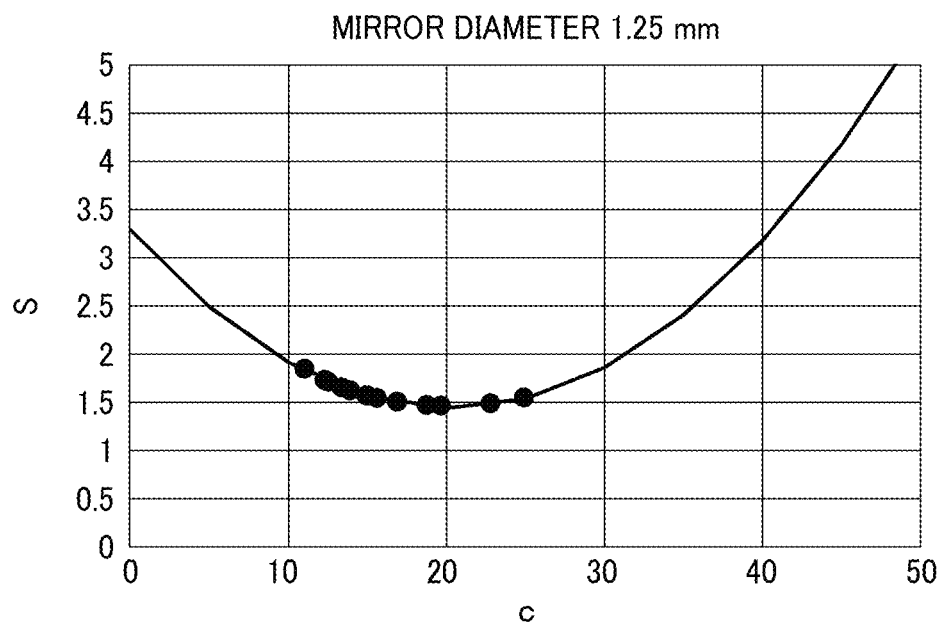
FIG. 19A and FIG. 19B are diagrams each illustrating a concrete example of the relation between a mirror diameter and a beam spot diameter, according to embodiments of the present disclosure.
Figure 19B:
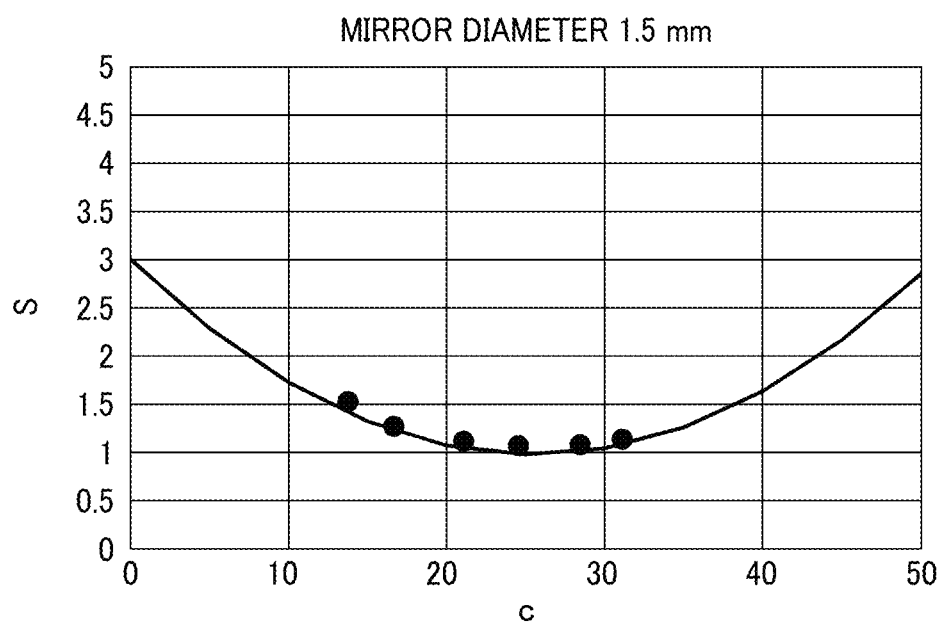

FIG. 19A and FIG. 19B are diagrams each illustrating a concrete example of the relation between the mirror diameter and the beam spot diameter, according to the present embodiment.

FIG. 19A is a diagram illustrating the relation between the beam spot diameter and the lens diameter when the effective diameter of the mirror of the light deflector 13 is 1.25 millimeters (mm). FIG. 19B is a diagram illustrating the relation between the beam spot diameter and the lens diameter when the effective diameter of the mirror of the light deflector 13 is 1.5 mm.

Each round dot in FIG. 19A and FIG. 19B indicates the result of the simulation of the beam spot diameter under the condition of the mirror of the light deflector 13, and each solid line in FIG. 19A and FIG. 19B indicates the plots of the above first equation.

In order to satisfy the second equation under the conditions as illustrated in FIG. 19A and FIG. 19B, "c" that indicates "Image Size I/Effective Diameter a of Mirror of Light Deflector 13" needs to be set to 10 to 31 mm and 8 to 42 mm, respectively.

A method of manufacturing a microlens array according to the present embodiment is described below. As known in the art, the micro-lens array is manufactured by producing a mold having a transfer surface of a lens surface array of the micro-lens array and transferring a mold surface to a resin material by using the mold. The transfer surface of the mold may be formed using, for example, cutting or photolithography processes. In addition, the transferring of the transfer surface to the resin material can be performed, for example, by injection molding. As described above, for example, the microlenses according to the present embodiment may be injection-molded with a resin material, using a mold having a transfer surface for the lens surface of a horizontally-oriented microlens.

The reduction of the radius of curvature of the boundary portion between the adjacent micro-lenses can be implemented by reducing the boundary width. The small boundary width can be implemented by "sharpening" the boundary portion formed between the adjacent micro-lens surfaces.

In the mold for micro-lens array, as a method of reducing the size of the "boundary width between the adjacent micro-lenses" down to the order of wavelength, a method of increasing the radius of curvature of each micro-lens by anisotropic etching and ion processing to remove non-lens portions of the boundary portion, and a method of removing a flat surface between adjacent micro-lenses by using isotropic dry etching are known in the art. For example, by using the above-described well-known methods, it is possible to manufacture a micro-lens array where the radius of curvature of the surface constituting the boundary portion between the adjacent micro-lenses is sufficiently small. In other words, the above-described to-be-scanned surface can be configured as a micro-lens array having a structure where a plurality of micro-lenses are arranged to be in close contact with each other.

By forming the micro-lens array where the radius of curvature r of the surface constituting the boundary portion between the adjacent micro-lenses is smaller than 640 nm, the coherent noise due to the R component beam can be prevented. In addition, by forming the micro-lens array where the radius of curvature r is smaller than 510 nm, the coherent noise due to the R component beam and the G component beam can be prevented. By forming the micro-lens array where the radius of curvature r of the surface constituting the boundary portion between the adjacent micro-lenses is smaller than 445 nm, the coherent noise due to the R, G, and B component beams can be prevented.

Figure 20:
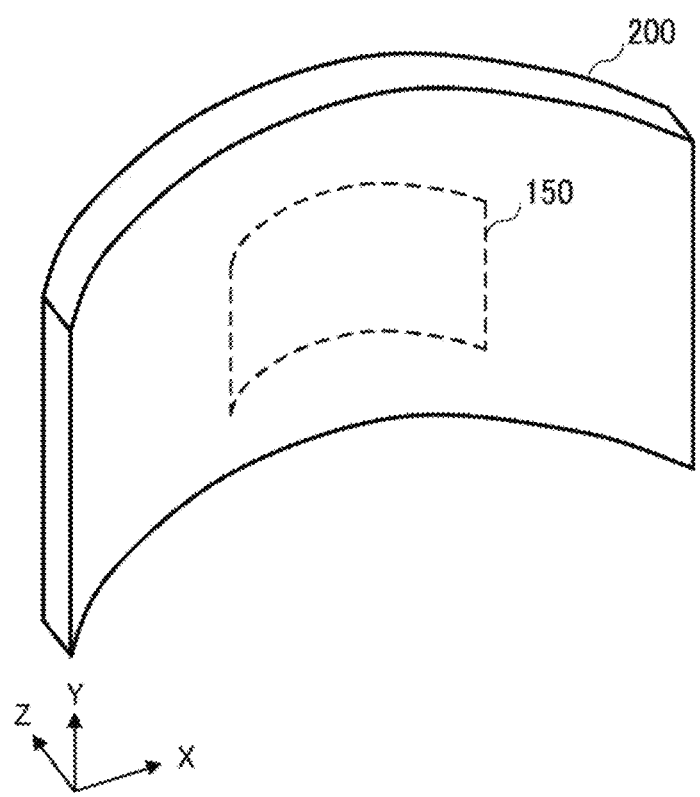
FIG. 20 is a diagram illustrating a structure of a microlens array according to embodiments of the present disclosure.

As illustrated in FIG. 20, the microlens array 200 may be curved in the entire array structure. In such a configuration, preferably, the direction of curvature (X-axis direction) of the microlens array 200 is matched with the major (longer) axis direction (X-axis direction) of the microlenses 150. Due to this configuration, in the display device 10, the divergence angle of the diverging light 153 that diverges as passing through the microlenses 150 can be adjusted to a desired angle of view without being affected by the size of the microlens array 200, and the utilization efficiency of light improves.

As the lens-array surface of the microlens array 200 is curved, the difference in optical-path length between the optical scanning element (i.e., a MEMS mirror) and lens-array surface can be kept constant in the display device 10. As the beam diameter formed on the lens-array surface is determined by the optical-path length, the beam diameter can be kept constant in the display device 10 when the lens-array surface is curved. Further, as interfering noise is caused as a beam sticks out from the lens, the beam diameter can be kept constant in the display device 10. As a result, the interfering noise can be reduced, and high resolution is achieved.

Further, in the above embodiments, instead of the microlens array (an optical element having micro-convex lens arrangement), a micromirror array (a micro convex mirror structure as an example of a curved portion, in other words, an optical element having a plurality of projections arranged in an array) may be employed as the to-be-scanned surface. In other words, the embodiments as described above can be practiced with a micromirror array instead of a microlens array. As an alternative embodiment of the curved portion, a micromirror may be a concave portion. In such a configuration, the vertex of such a concave portion corresponds to the vertex of a convex portion that has a similar figure to that concave portion.

Figure 21:
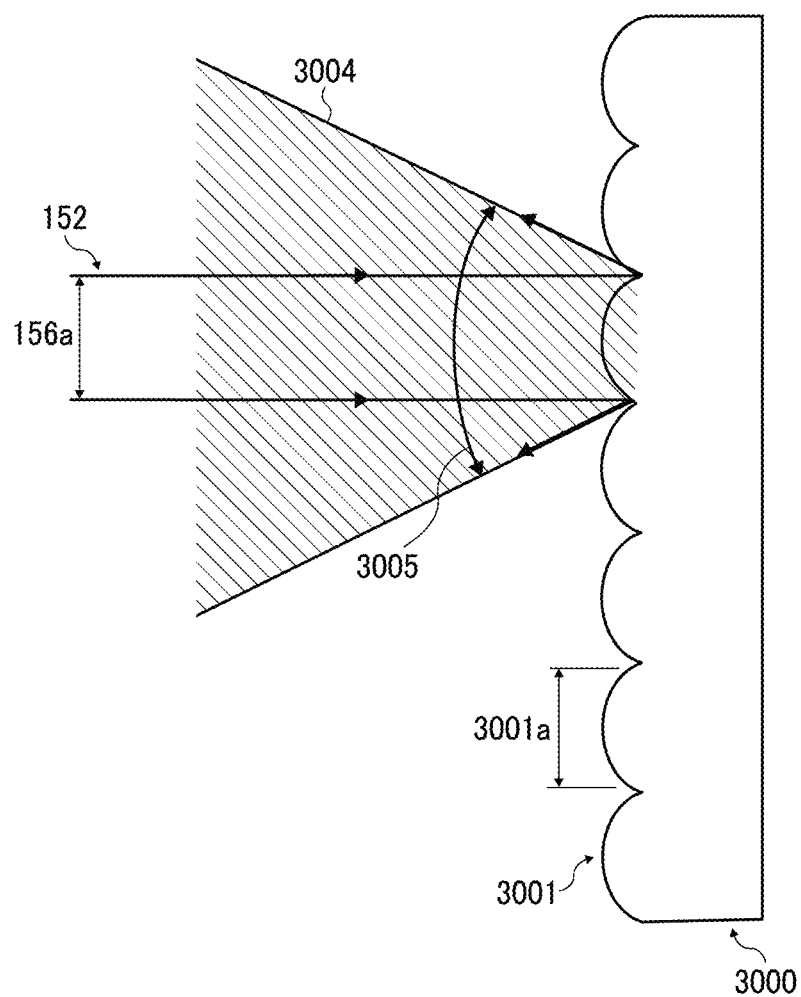
FIG. 21 is a diagram illustrating a micromirror array according to embodiments of the present disclosure.

FIG. 21 is a diagram illustrating a micromirror array (MMA) 3000 as an optical element having a micro-convex mirror arrangement, according to the present embodiment.

As an example configuration in which a plurality of curved portions through which the light diverges are provided, as illustrated in FIG. 21, the micromirror array 3000 is provided with a plurality of micro convex mirrors (micro-mirrors) 3001 arranged in an array.

The size 3001a of the micro convex mirror 3001 is larger than the diameter 156a of the incident light 152. Note that the incident light 152 according to the present embodiment is light flux and has a light intensity distribution of a Gaussian distribution around the center of the light flux. Accordingly, the diameter 156a indicates the distance in the radial direction of light flux, where the light intensity in the light intensity distribution is decreased to "1/e2."

In FIG. 21, the diameter 156a is illustrated to have a size equal to the size 3001a of the micro convex mirror 3001. However, the diameter 156a does not need to be equal to the size 3001a of the micro convex mirror 3001. The point is that the incident light beam to the micro convex mirror 3001 only has to be within the micro convex mirror 3001.

As illustrated in FIG. 21, the entire incident light 152 is incident on a single micro convex mirror 3001, and is converted into diffused light flux 3004 with a divergence angle 3005. Note that the "divergence angle" may be referred to as a "diffusion angle" in some cases.

In FIG. 21, no coherent noise (speckle noise) occurs as the diffused light flux 3004 does not interfere with any light flux. The size of the divergence angle 3005 may be set by adjusting the shape of the micro convex mirror 3001 as appropriate.

As described above, the display system 1 according to embodiments of the present disclosure is provided with the screen 15 through which the light diverges (an example of an optical device), the light deflector 13 that scans the light beams that are emitted from the light-source device 11 (an example of a light source) in the main scanning direction and the sub-scanning direction orthogonal to the main scanning direction to form the intermediate image i on the screen 15, and the free-form surface mirror 30 (an example of an imaging optical system) that projects the diverging light diverging through the screen 15 to form an image. The effective diameter "a" of the mirror of the light deflector 13 for the intermediate Image "i" and the ratio "c" of the image size I of the virtual image 45 formed by the free-form surface mirror 30 to the effective diameter "a" satisfy the condition in the second equation given below.

$$2 \geq 0.007 a^{-2} c^2 + 0.75 a^{-0.75} c + 0.5 a^{-0.5}$$ Second Equation

Due to such a configuration, a concrete optical parameter in design can be determined that controls the value of "Beam Spot Diameter/Lens Diameter" to be equal to or shorter than two. Accordingly, as illustrated in FIG. 7A and FIG. 7B, the coherent noise (optical noise) can practically be controlled.

Further, the display system 1 is provided with the condenser lens 117 that concentrates the light emitted from the light-source element 111 towards the light deflector 13. Due to this configuration, the magnifying power in the entire system decreases on the light deflector 13, and the light deflector 13 can be supplied with laser beams in a stable manner.

The screen 15 has a structure in which hexagonal-shaped microlenses are arranged in a honeycomb pattern. For this reason, the coherent noise is distributed in three directions. The maximum intensity of the coherent light generating the coherent noise is constant. As the number of dispersion directions becomes large, the "contrast of the generated coherent noise" can be allowed to be weak, so that the coherent noise is difficult to visually recognize (inconspicuous).

Accordingly, in a case where the generation of the "coherent noise due to the component having a wavelength smaller than the radius of curvature r of the boundary portion" is allowed, it is desired that the array of the screen 15 be a "honeycomb-shaped array". When the boundary width is larger than the wavelength λR, the coherent noise due to the coherent light of the R component is also generated. In view of these circumstances and coherent noise, it is advantageous for each microlens of the screen 15 to be hexagonal-shaped rather than rectangular-shaped and be arrayed in a honeycomb shape.

Due to the zigzag structure of a honeycomb-shaped array, the effective pixel pitches "X2" in the X-direction are narrow. Accordingly, the number of pixels in the X-direction can be improved in the image display.

Due to the armchair-type structure of a honeycomb-shaped array, the effective pixel pitches "Y3" in the Y-direction are narrow. Accordingly, the number of pixels in the Y-direction can be improved in the image display.

Due to its microlens-array structure, the screen 15 does not have to reflect the laser beams, and this could be advantageous to the layout of a vehicle.

As the screen 15 has a curved surface, the screen 15 can effectively correct the distortion caused by the observation optical system, and this could reduce the amount of correction to be performed on the distortion.

The image formed by the free-form surface mirror 30 has a higher pixel density in a vertical direction than in a horizontal direction.

A wider viewing angle may be required in the horizontal direction than in the vertical direction such that the viewer 3 can view and recognize the virtual image 45 in a right-and-left slanting direction. In such a configuration, a greater divergence angle (anisotropic diffusion) is required for the horizontal direction (i.e., X-direction) of the magnified virtual image, with reference to the vertical direction (i.e., Y-direction) of the magnified virtual image. For this reason, it is desired that the pixel density in the vertical direction be increased compared with the pixel density in the horizontal direction and that the divergence angle at which the pixel displaying beam diverges be "wider in the lateral direction than in the vertical direction of a two-dimensional image."

As described above, according to the above embodiments of the present disclosure, the utilization efficiency of light and the brightness of display image can be improved as the light diverges to a minimum area that satisfies the desired angle of view.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

The display device according to an embodiment of the present disclosure is applicable not only to a heads-up display (HUD) but also to, for example, a head-mounted display, a prompter, and a projector. For example, when a display device according to an embodiment of the present disclosure is applied to a projection device, such a projection device can be configured in a similar manner to the display device 10. In other words, the display device 10 may project the image light onto, for example, a projection screen or a wall through the free-form surface mirror 30. The display device 10 may project the image light that has passed through the screen 15 onto, for example, a projection screen or a wall, without involving the free-form surface mirror 30.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. A display system comprising:
an optical device through which light diverges;
a light deflector configured to scan a light emitted from a light source in a main scanning direction and a sub-scanning direction orthogonal to the main scanning direction to form an intermediate image on the optical device; and
an imaging optical system configured to project diverging light diverging through the optical device to form an image,
wherein an effective diameter a of a mirror of the light deflector for the intermediate image and a ratio c of a size of an image formed by the imaging optical system to the effective diameter a satisfy a condition in an equation $$2 \geq 0.007a^{-2}c^2 + 0.75a^{-0.75}c + 0.5a^{-0.5}.$$

2. The display system according to claim 1, further comprising a condenser lens configured to concentrate the light emitted from the light source towards the light deflector.

3. The display system according to claim 1, wherein the optical device has a structure in which hexagonal-shaped elements are arranged in a honeycomb pattern.

4. The display system according to claim 3, wherein the hexagonal-shaped elements arranged in the honeycomb pattern have a zigzag structure.

5. The display system according to claim 3, wherein the hexagonal-shaped elements arranged in the honeycomb pattern have an armchair-type structure.

6. The display system according claim 1, wherein the optical device includes a microlens array.

7. The display system according to claim 1, wherein the optical device has a curved surface.

8. The display system according to claim 1, wherein the image formed by the imaging optical system has a higher pixel density in a vertical direction than in a horizontal direction.

9. The display system according to claim 1, further comprising a reflector configured to reflect the diverging light projected by the imaging optical system to form a virtual image.

10. A mobile object comprising
a display system including:
an optical device through which light diverges;
a light deflector configured to scan a light emitted from a light source in a main scanning direction and a sub-scanning direction orthogonal to the main scanning direction to form an intermediate image on the optical device;
an imaging optical system configured to project diverging light diverging through the optical device to form an image; and
a reflector configured to reflect the diverging light projected by the imaging optical system to form a virutal image,
wherein an effective diameter a of a mirror of the light deflector for the intermediate image and a ratio c of a size of an image formed by the imaging optical system to the effective diameter a satisfy a condition in an equation $$2 \geq 0.007a^{-2}c^2 + 0.75a^{-0.75}c + 0.5a^{-0.5}.$$

and
wherein the reflector is a front windshield.

11. An optical element used for a display system, the display system comprising:
an optical device through which light diverges;
a light deflector configured to scan a light emitted from a light source in a main scanning direction and a sub-scanning direction orthogonal to the main scanning direction to form an intermediate image on the optical device; and
an imaging optical system configured to project diverging light diverging through the optical element to form an image,
wherein an effective diameter a of a mirror of the light deflector for the intermediate image and a ratio c of a size of an image formed by the imaging optical system to the effective diameter a satisfy a condition in an equation $$2 \geq 0.007a^{-2}c^2 + 0.75a^{-0.75}c + 0.5a^{-0.5}.$$

* * * * *